United States Patent
Kurtz et al.

(10) Patent No.: US 10,823,045 B2
(45) Date of Patent: Nov. 3, 2020

(54) METHODS AND SYSTEMS FOR A PISTON

(71) Applicant: Ford Global Technologies, LLC, Dearborn, MI (US)

(72) Inventors: Eric Kurtz, Dearborn, MI (US); Nan Robarge, Saline, MI (US); Daniel Kantrow, Ann Arbor, MI (US); Christopher Polonowski, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/191,329

(22) Filed: Nov. 14, 2018

(65) Prior Publication Data

US 2020/0149465 A1 May 14, 2020

(51) Int. Cl.
*F02B 23/06* (2006.01)
*F02B 23/10* (2006.01)

(52) U.S. Cl.
CPC ...... *F02B 23/0687* (2013.01); *F02B 23/0621* (2013.01); *F02B 23/101* (2013.01)

(58) Field of Classification Search
CPC .. F02B 23/06; F02B 23/0687; F02B 23/0621; F02B 23/101
See application file for complete search history.

(56) References Cited

U.S. PATENT DOCUMENTS

| | | | |
|---|---|---|---|
| 4,924,759 A | 5/1990 | Plummer | |
| 4,953,528 A | 9/1990 | Oikawa et al. | |
| 5,103,784 A | 4/1992 | Evans | |
| 6,199,544 B1 | 3/2001 | Feuling | |
| 8,459,229 B2 | 6/2013 | Rothbauer et al. | |
| 8,555,854 B2 | 10/2013 | Rothbauer et al. | |
| 8,978,621 B2 * | 3/2015 | Easley | F02B 23/0624 123/193.6 |
| 9,234,451 B2 * | 1/2016 | Karch | F02B 23/06 |
| 9,238,996 B2 * | 1/2016 | Easley | F02B 23/0624 |
| 9,279,361 B2 | 3/2016 | Rothbauer et al. | |
| 2006/0090726 A1 | 5/2006 | Meffert et al. | |
| 2008/0148933 A1 | 6/2008 | Fisher et al. | |
| 2009/0188481 A1 | 7/2009 | Zhu et al. | |
| 2010/0108044 A1 | 5/2010 | Liu | |
| 2010/0258076 A1 | 10/2010 | Eismark et al. | |
| 2015/0260081 A1 | 9/2015 | Morgan | |

FOREIGN PATENT DOCUMENTS

DE    102013022040 A1    6/2015

* cited by examiner

*Primary Examiner* — Hieu T Vo
(74) *Attorney, Agent, or Firm* — Geoffrey Brumbaugh; McCoy Russell LLP

(57) ABSTRACT

Methods and systems are provided for a piston. In one example, a system may comprise a plurality of first protrusions and a plurality of second protrusions working in tandem to confine an injection to a radial zone defined by the protrusions.

19 Claims, 13 Drawing Sheets

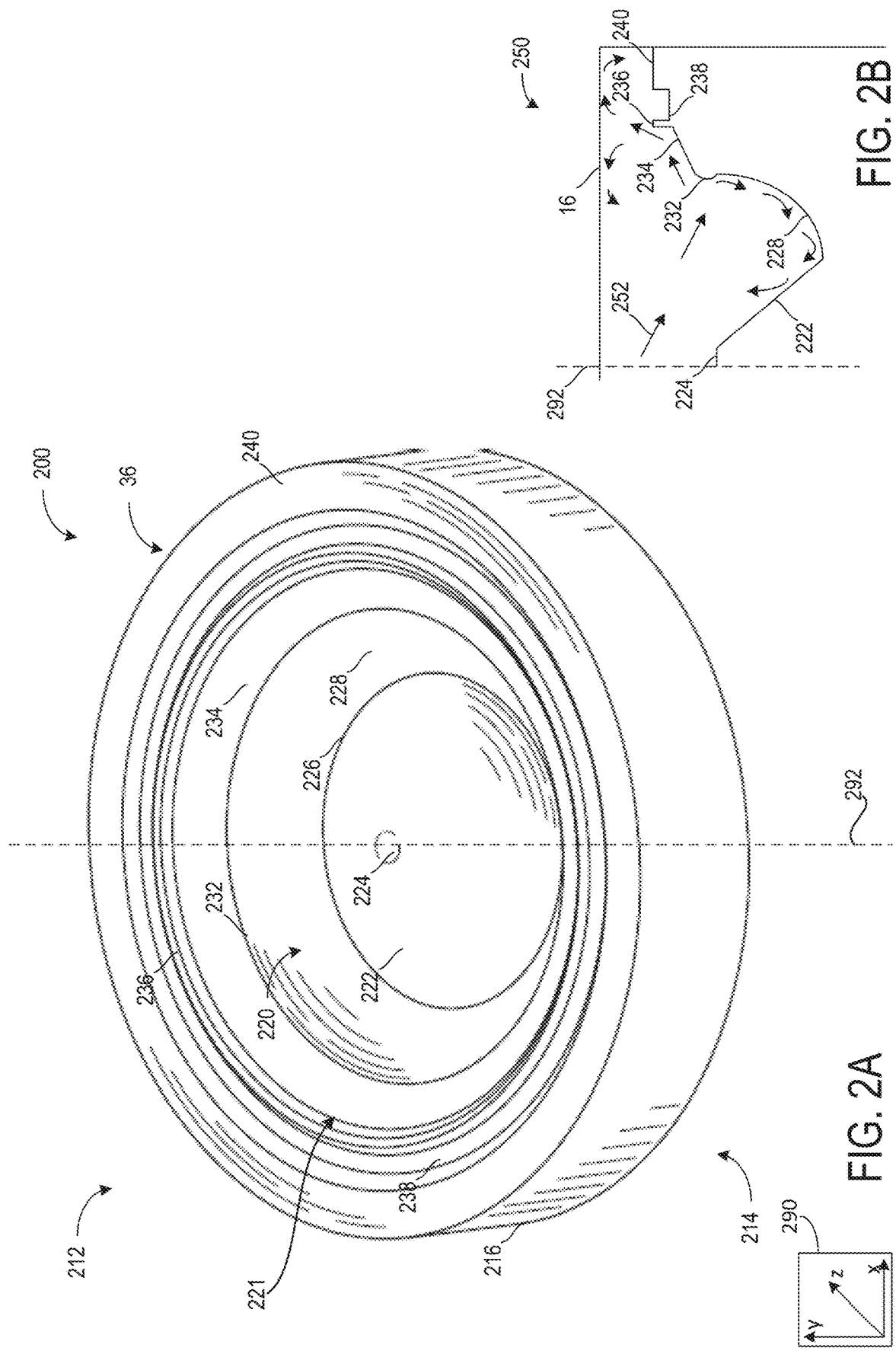

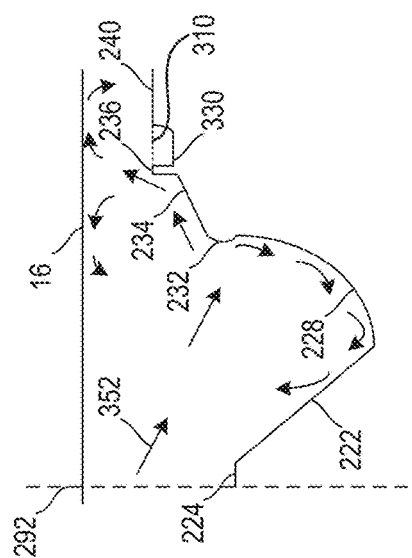
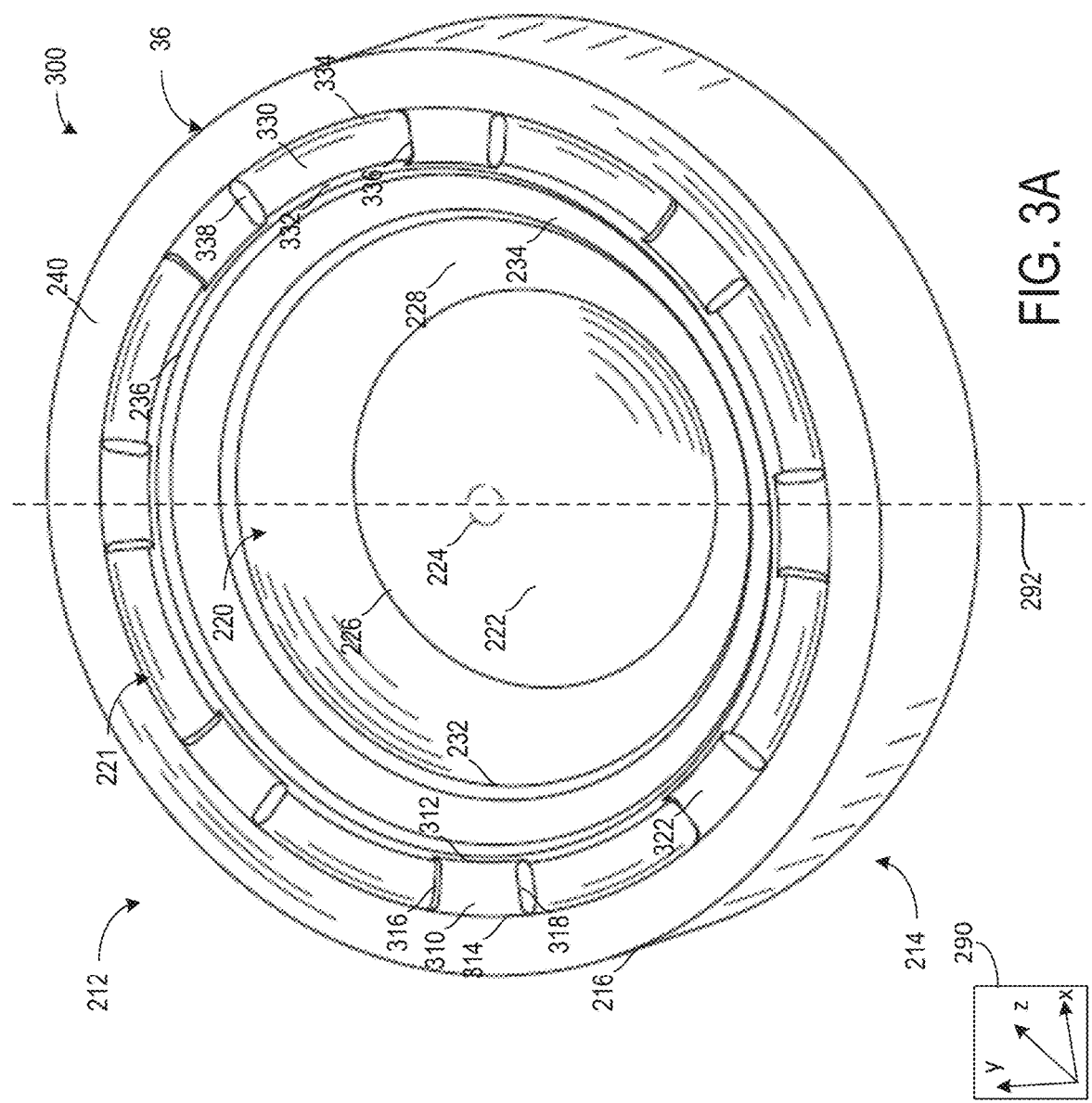

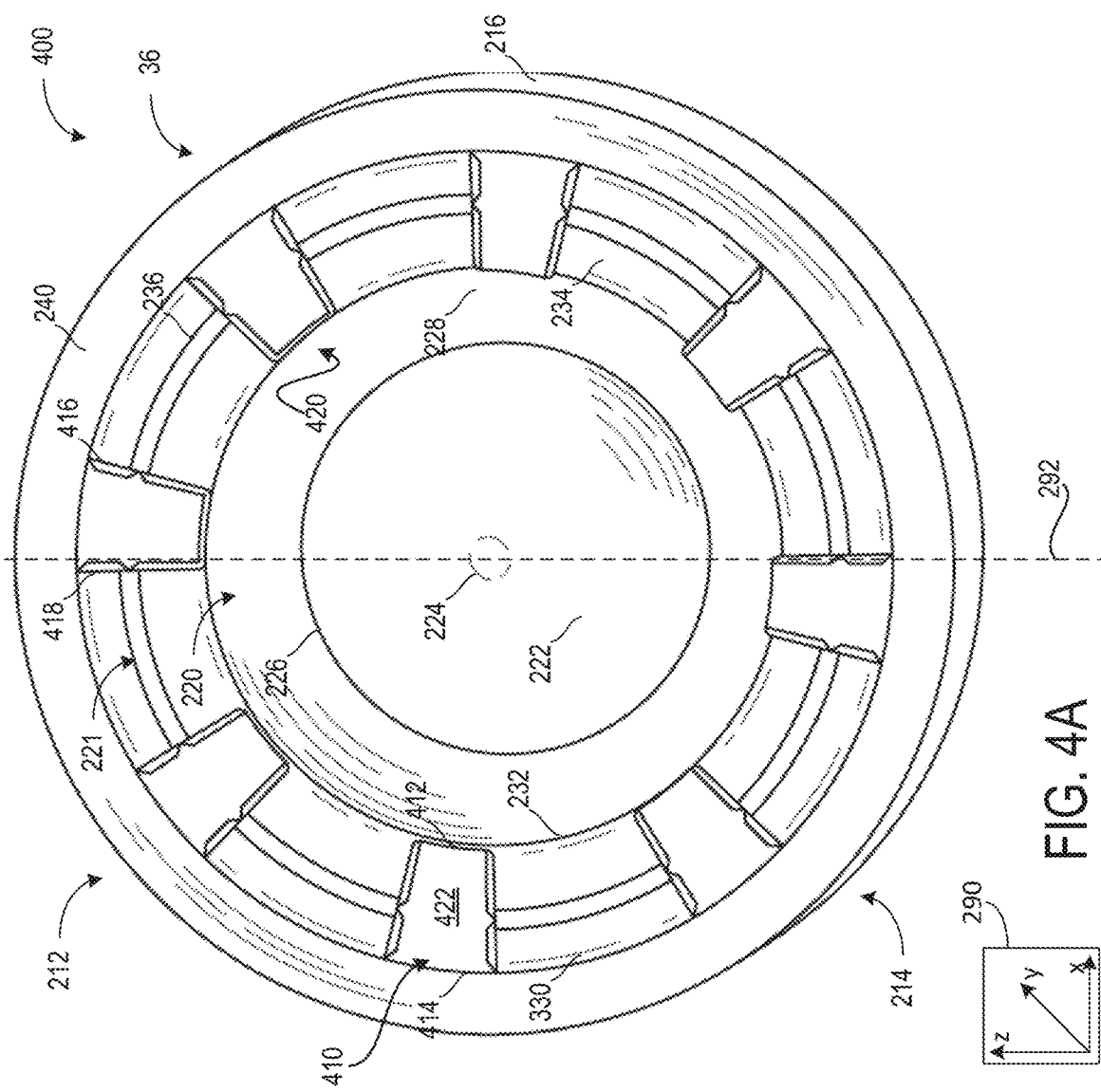
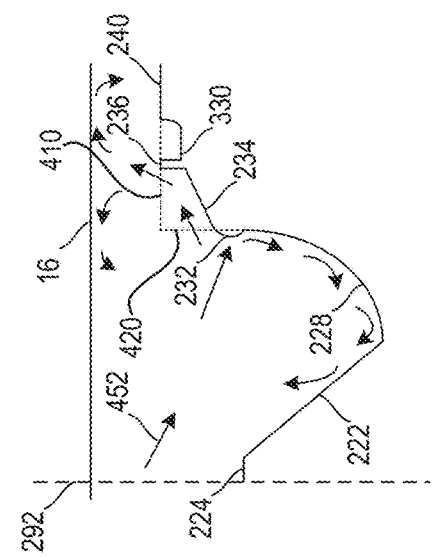

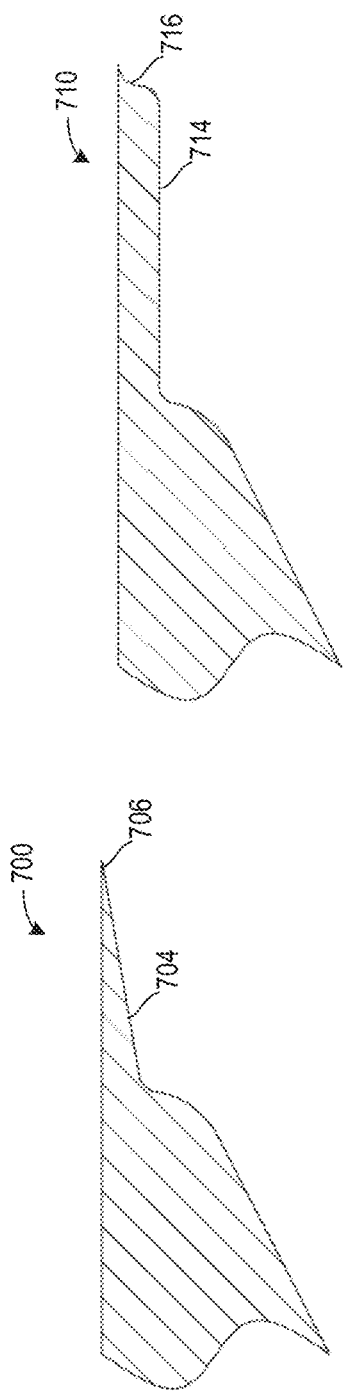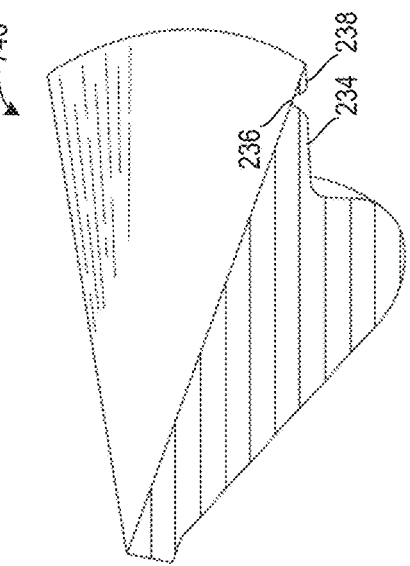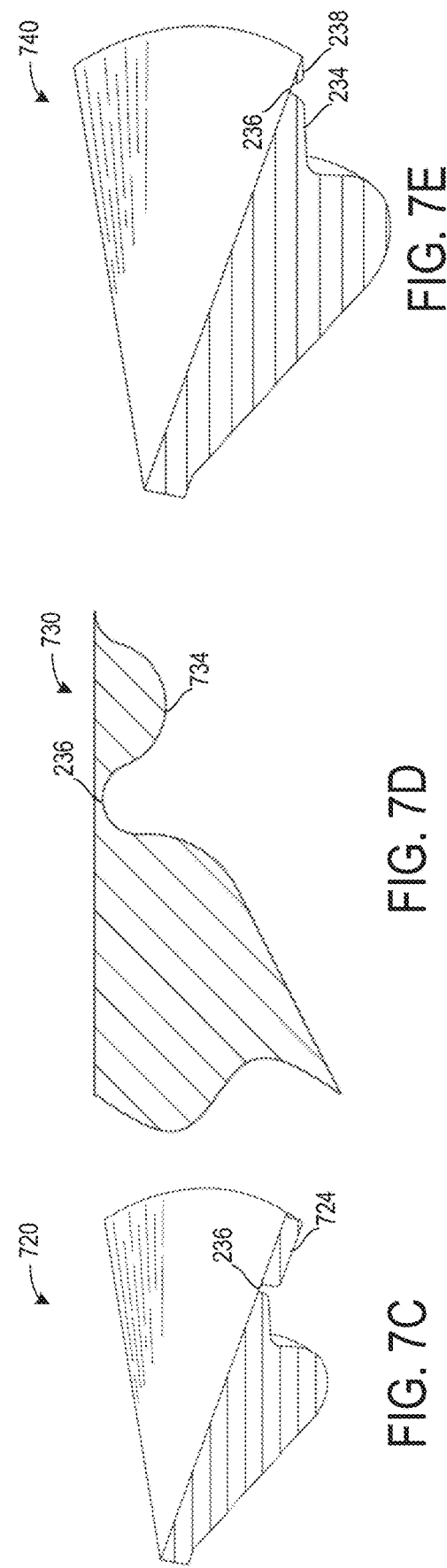
FIG. 7A
FIG. 7B
FIG. 7C
FIG. 7D
FIG. 7E

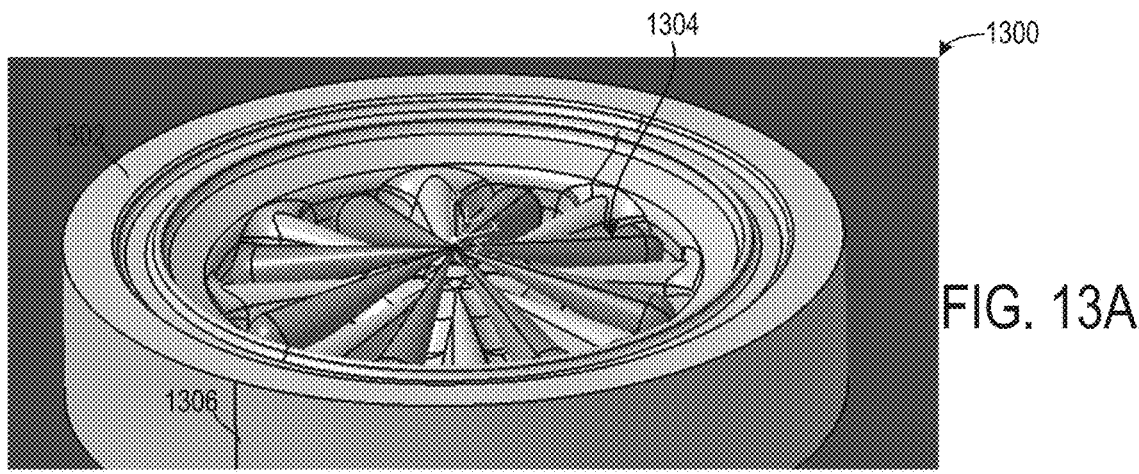
FIG. 13A
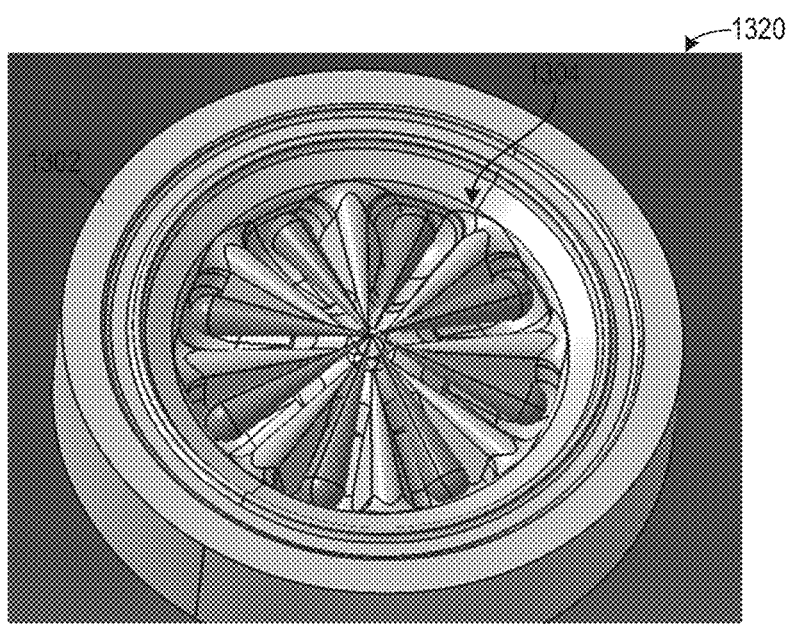
FIG. 13B
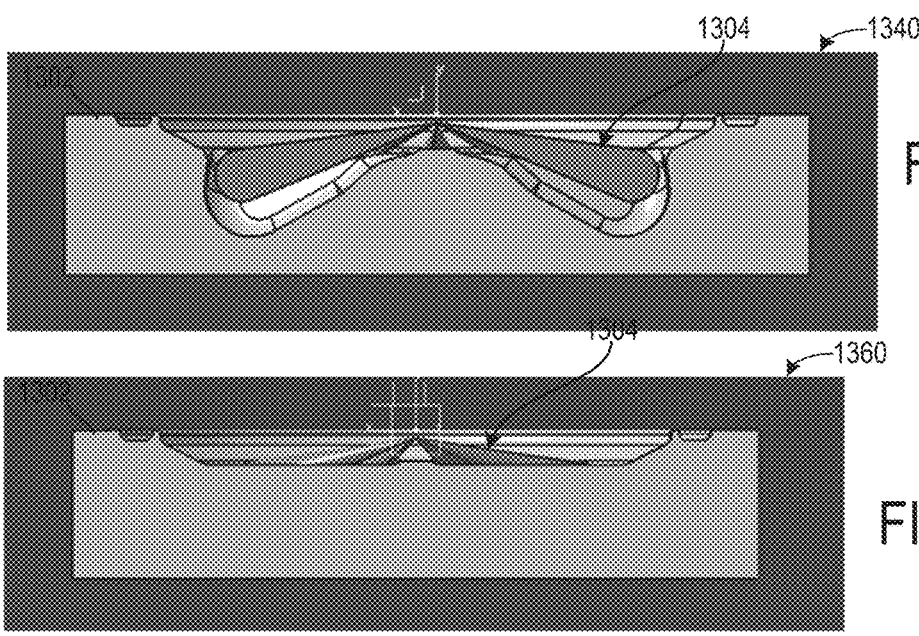
FIG. 13C
FIG. 13D

METHODS AND SYSTEMS FOR A PISTON

FIELD

The present description relates generally to a piston comprising one or more features for enhancing fuel flow into a squish region.

BACKGROUND/SUMMARY

In engines, air is drawn into a combustion chamber during an intake stroke by opening one or more intake valves. Then, during the subsequent compression stroke, the intake valves are closed, and a reciprocating piston of the combustion chamber compresses the gases admitted during the intake stroke, increasing the temperature of the gases in the combustion chamber. Fuel is then injected into the hot, compressed gas mixture in the combustion chamber. The mixture may be ignited via a spark or upon reaching a threshold pressure. The combusting air-fuel mixture pushes on the piston, driving motion of the piston, which is then converted into rotational energy of a crankshaft.

Fuel/air mixing may be dictated via one or more of a piston bowl shape, fuel injection timing, fuel injector nozzle shape, and fuel injector nozzle arrangement. To promote more thorough and complete combustion, it may be desired to increase fuel/air mixing so that pockets of fuel are mitigated to limit particulate emissions. Efforts to adjust fuel injection timing and injector shape to limit wetting of the piston and surfaces of the combustion chamber are known, however, attempts to deliberately direct a fuel injection at surfaces of the piston to increase fuel mixing in a squish region of a combustion chamber are limited.

Other attempts to address piston shape to promote fuel mixing include shaping the piston to preserve a momentum of the spray/flame toward a center of the piston. One example approach is shown by Eismark et al. in U.S. 2010/0258076. Therein, a piston crown comprises an upper surface facing a combustion chamber and a piston bowl comprising a projecting portion having a distal end and an inner bowl floor section extending downwardly at a positive inner bowl floor angle from a plane perpendicular to an axis of reciprocation of the piston. The piston bowl further comprises an outwardly flared outer bowl section having a concave curvilinear shape in cross-section. Fuel spray fumes may become ignited and impinge onto impingement areas of the outer bowl section to maintain kinetic energy and be redirected toward a central axis of the piston.

Another example approach is shown by Zoller in D. E. 102013022040A1. Therein, a piston crown comprises an omega-type cavity with an overhang step protruding over a portion of the cavity. Radially exterior to the step there is a hump comprising a height, measured along an axis of reciprocation of the piston, less than a height of a top of the piston. Between the hump and an outer rim of the piston there is a circular groove for imparting a swirl and/or vortex onto a fuel spray.

However, the inventors herein have recognized potential issues with such systems. As one example, each of Eismark and Zoller teach piston shapes which promote flow radially outward, but do not promote flow in an upward direction parallel to the axis about which the piston reciprocates. That is to say, both piston shapes promote flow in radial inward and outward directions, but do not sufficiently promote flow upwards. These shortcomings of the previous piston examples may not meet increasingly stringent emission regulations.

In one example, the issues described above may be addressed by an engine comprising at least one combustion chamber and an injector positioned to inject directly therein, and a piston positioned to oscillate within the combustion chamber, a plurality of first protrusions arranged in an upper, chamfered region of the piston, and a plurality of second protrusions arranged in a piston bowl, wherein the piston is positioned to confine an injection of the injector to radial zones between adjacent protrusions of the plurality of first and second protrusions. In this way, a fuel spray momentum may be maintained in a desired direction which may increase fuel/air mixing and decrease fuel deposit formation in the combustion chamber.

As one example, the plurality of first protrusions may maintain a momentum of the fuel spray back toward a center of the combustion chamber. The plurality of the second protrusions may promote fuel spray to flow toward a squish region of the piston. In this way, the first and second protrusions may increase fuel/air mixing through a volume of the combustion chamber. By doing this, emissions may decrease.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows a first embodiment of a piston.

FIG. 2B shows a cross-section of the first embodiment interacting with a combustion chamber mixture.

FIG. 3A shows a second embodiment of a piston.

FIG. 3B shows a cross-section of the second embodiment interacting with a combustion chamber mixture.

FIG. 4A shows a third embodiment of a piston.

FIG. 4B shows a cross-section of the third embodiment interacting with a combustion chamber mixture.

FIGS. 7A, 7B, 7C, 7D, and 7E show various embodiments of surface features arranged in a region of an outer rim of the piston for promoting a vortex.

FIGS. 2A-7E are shown approximately to scale, although other relative dimensions may be used, if desired.

FIGS. 13A, 13B, 13C, and 13D show additional views of a piston interacting with a plurality of fuel sprays.

DETAILED DESCRIPTION

The following description relates to systems and methods for a piston comprising one or more surface features for directing an injection in one or more desired directions. The piston may be arranged to oscillate in a combustion chamber, such as the combustion chamber illustrated in FIG. 1. The piston may comprise a variety of surface features, each surface feature comprising a different shape shaped to promote injection flow in one or more desired directions. Example surface features are shown in FIGS. 2-7E. Some surface features may be shaped to direct momentum of the injection toward a center of the piston. Other surface features may be shaped to direct momentum of the injection toward a squish region, distal to the center of the piston. Furthermore, some surface features may be shaped to promote a vortex in the squish region, which may promote fuel/air mixing and/or improve flame front conditions.

Figure 5A:
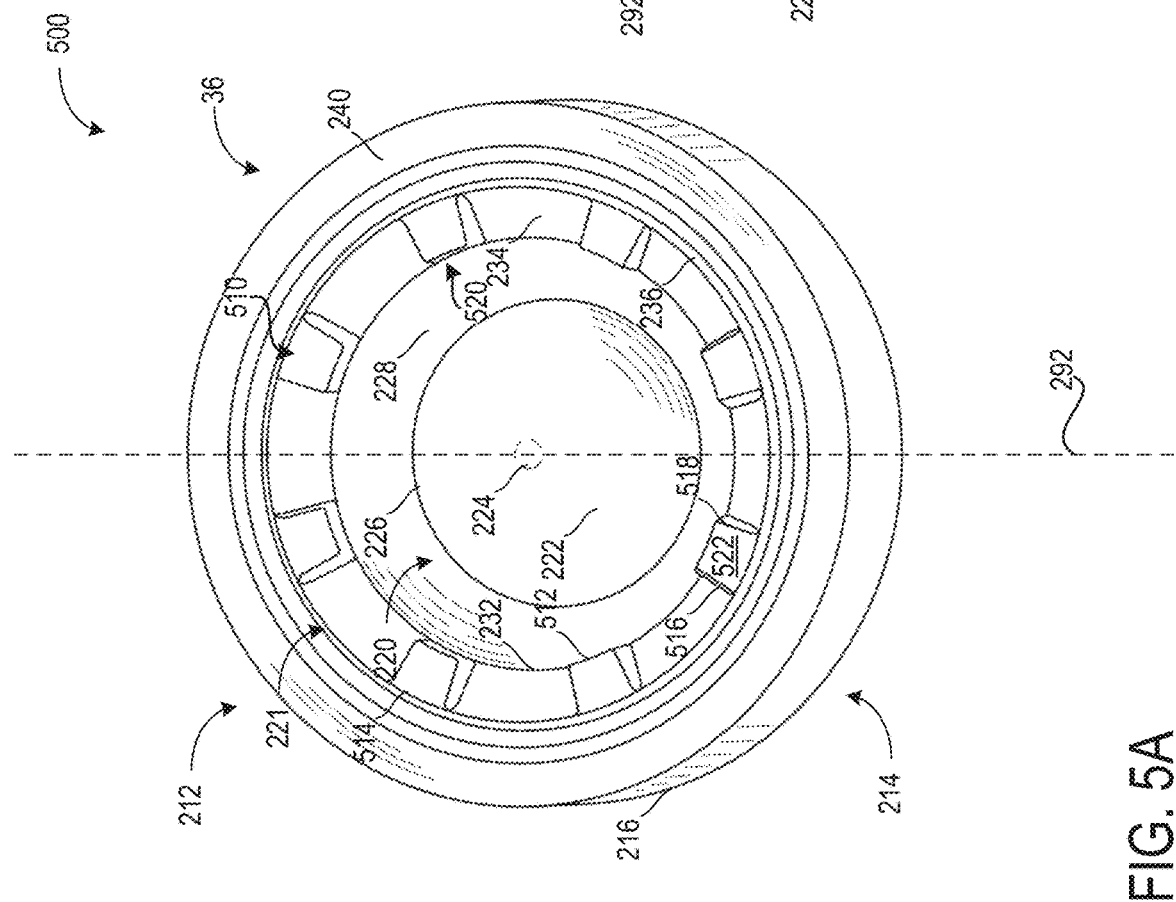
FIG. 5A shows a fourth embodiment of a piston.
Figure 5B:
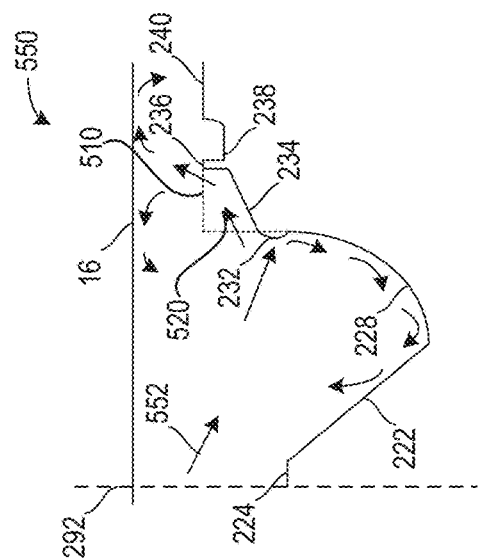
FIG. 5B shows a cross-section of the fourth embodiment interacting with a combustion chamber mixture.
Figures 6A, 6B:
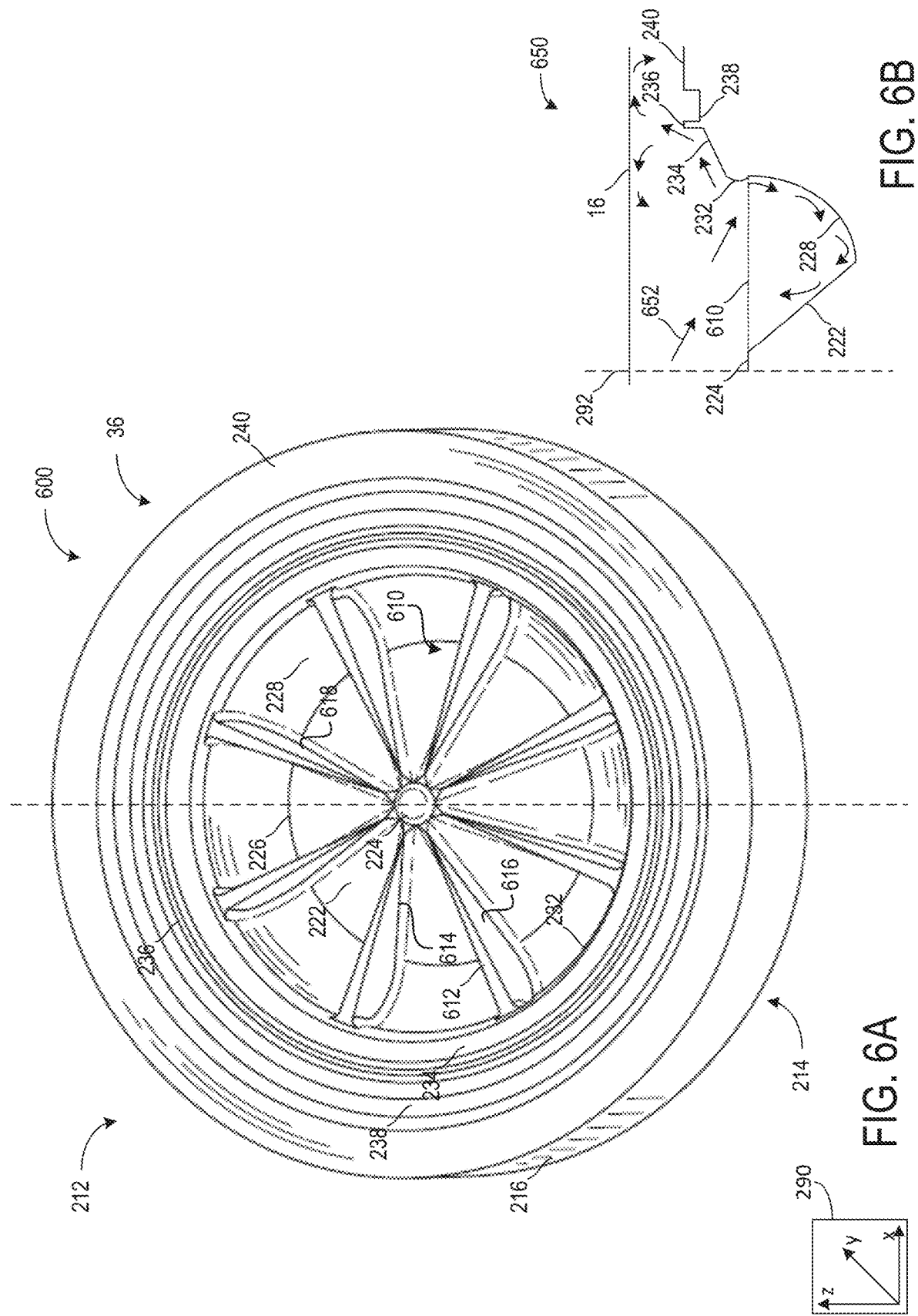
FIG. 6A shows a fifth embodiment of a piston.
FIG. 6B shows a cross-section of the fifth embodiment interacting with a combustion chamber mixture.

FIGS. 2A and 2B illustrate a shape of a piston comprising a piston bowl and a chamfered portion free of a plurality of protrusions and fins. The piston is illustrated free of these features to illustrate a shape of the piston in more clarity. FIGS. 3A, 4A, and 5A illustrate the chamfered portion of the piston comprising a plurality of protrusions, wherein the protrusions may be shaped to direct to fuel spray momentum in a vertical and radially outward direction by maintaining the fuel spray within a desired radial zone. FIGS. 3B, 4B, and 5B illustrate a cross-section of the piston comprising the plurality of protrusions interacting with a combustion chamber mixture. FIG. 6A illustrates an embodiment of the piston comprising a plurality of fins arranged in the piston bowl. The plurality of fins may be shaped to maintain fuel spray momentum in a radial direction such that when the fuel spray contacts portions of the piston, its momentum carries to back to a center of the piston. A cross-section of the piston comprising the plurality of fins interacting with a combustion chamber mixture is shown in FIG. 6B.

Figure 8:
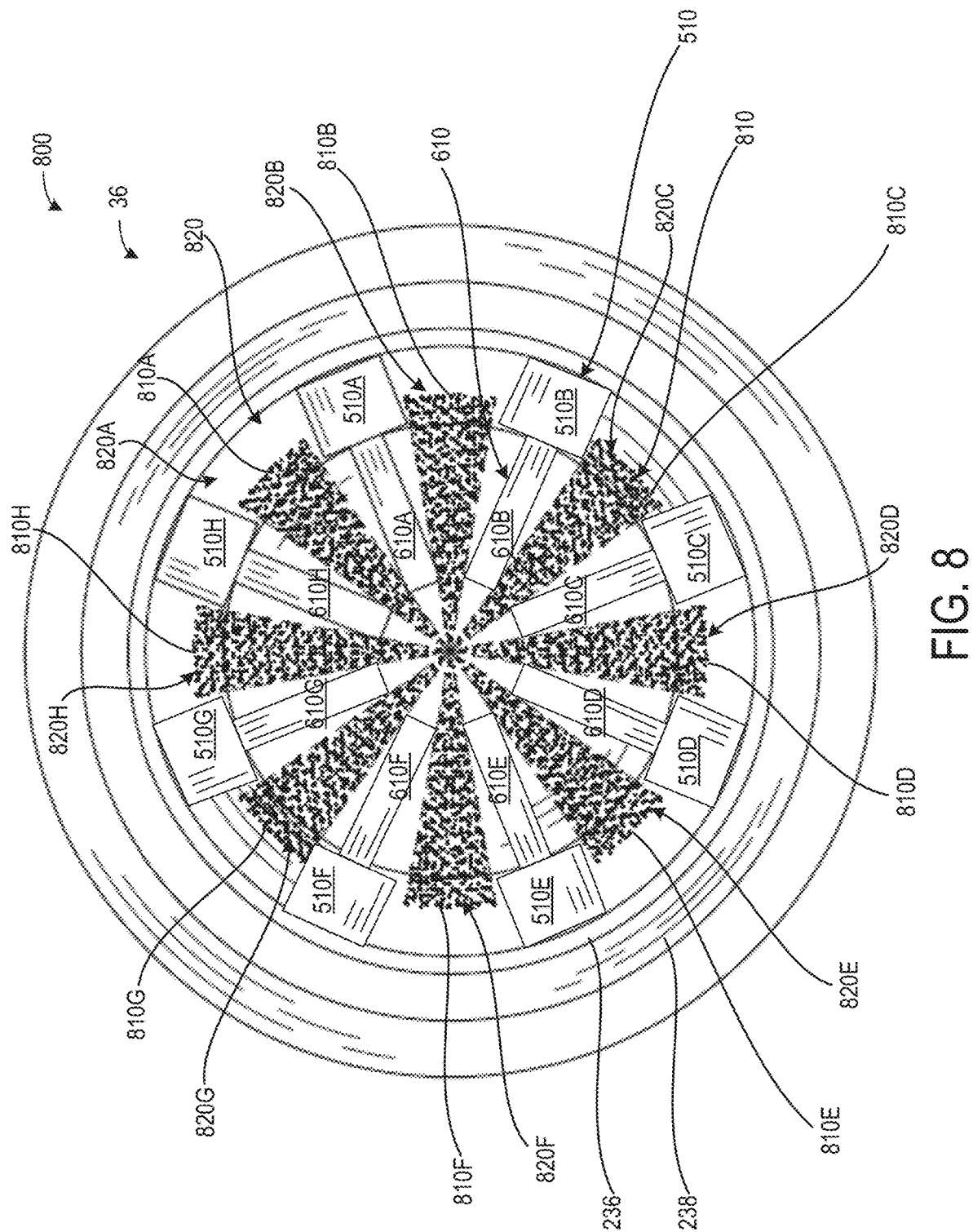
FIG. 8 shows a schematic of a piston along with a plurality of fuel sprays from an injector interacting with various surface features of the piston.
Figure 9A:
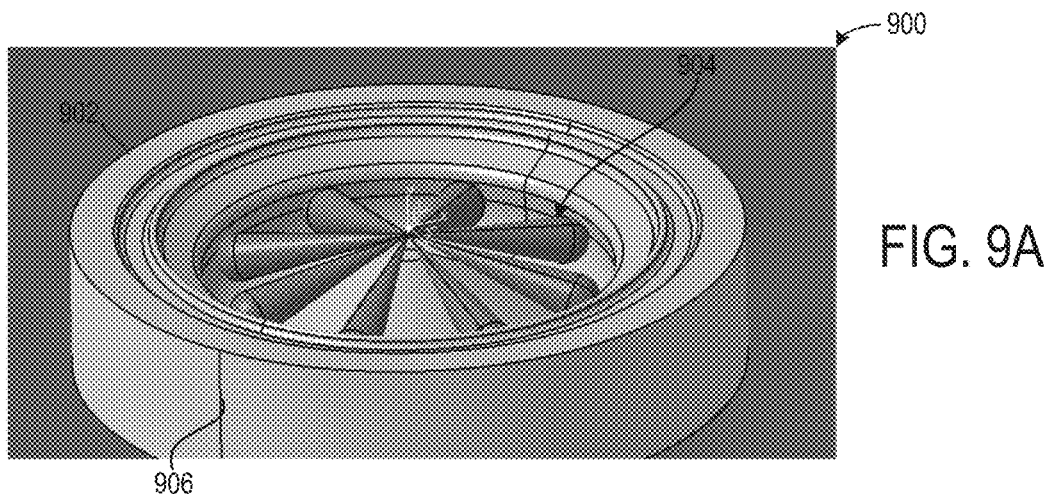
FIGS. 9A, 9B, 9C, and 9D show additional views of a piston interacting with a plurality of fuel sprays.
Figure 9B:
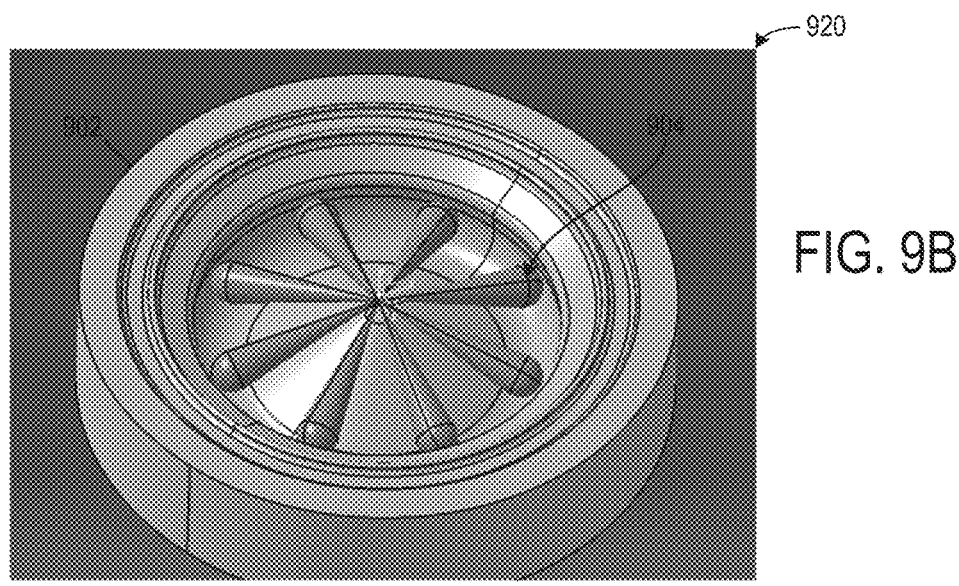
Figure 9C:
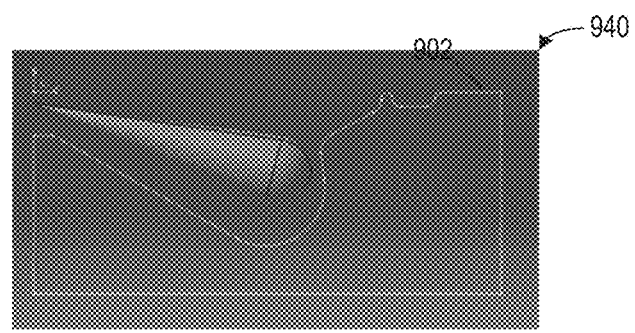
Figure 9D:
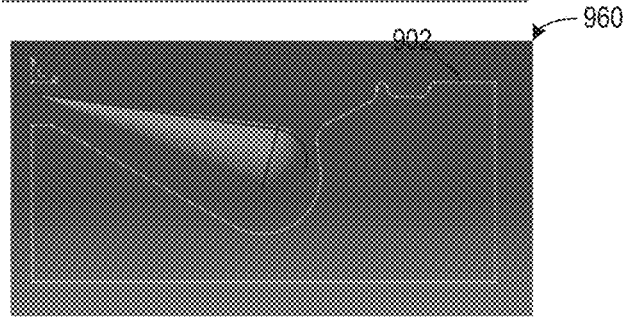
Figure 10A:
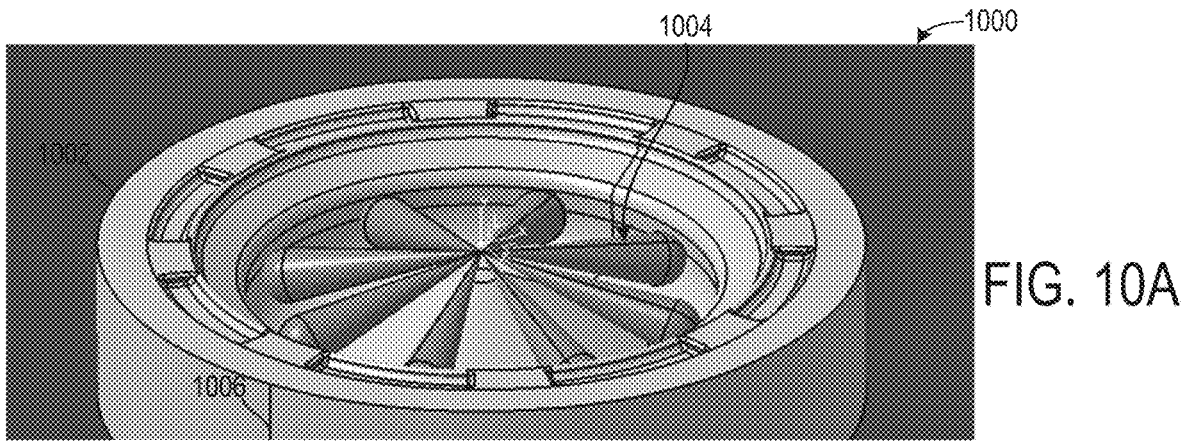
FIGS. 10A, 10B, 10C, and 10D show additional views of a piston interacting with a plurality of fuel sprays.
Figure 10B:
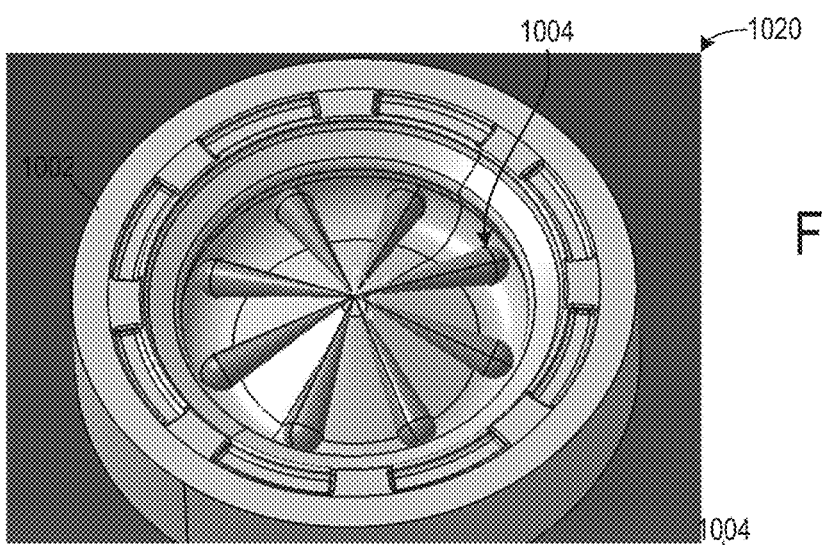
Figure 10C:
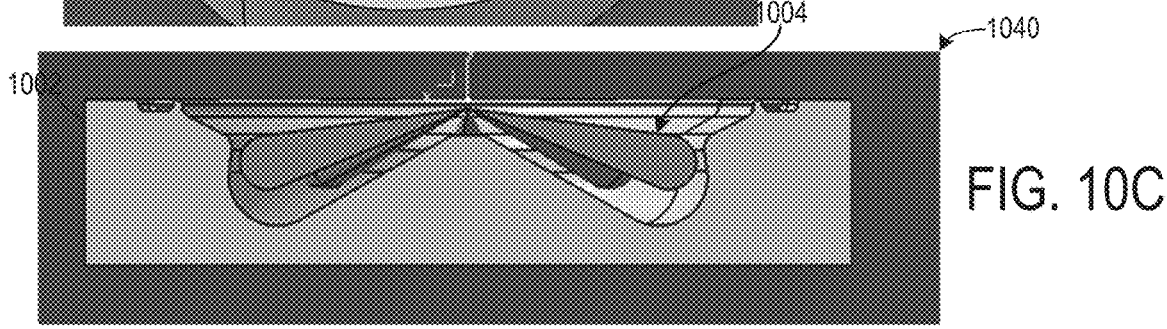
Figure 10D:
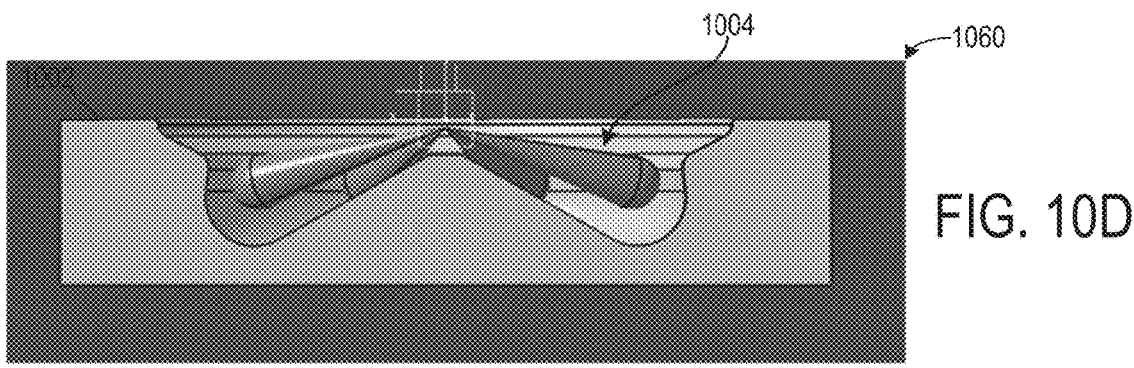
Figure 11A:
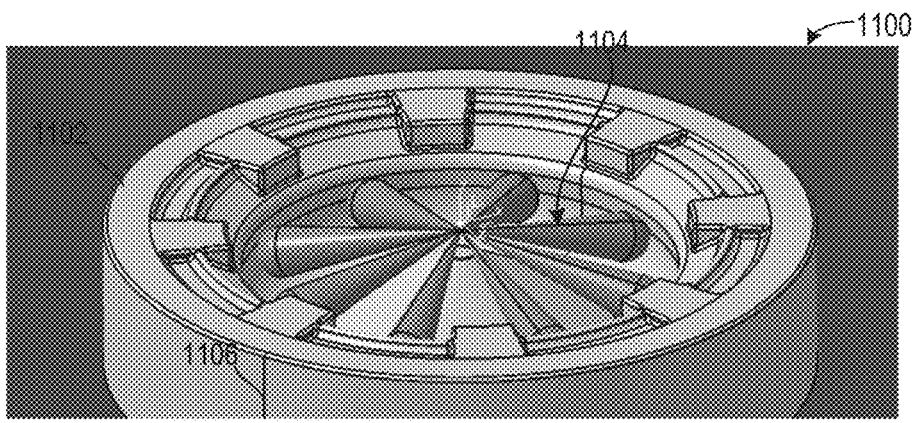
FIGS. 11A, 11B, 11C, and 11D show additional views of a piston interacting with a plurality of fuel sprays.
Figure 11B:
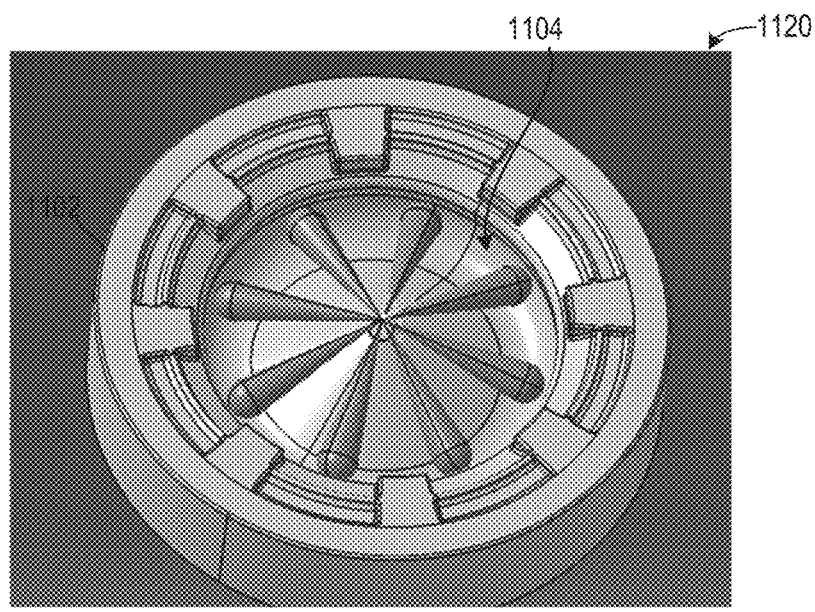
Figure 11C:
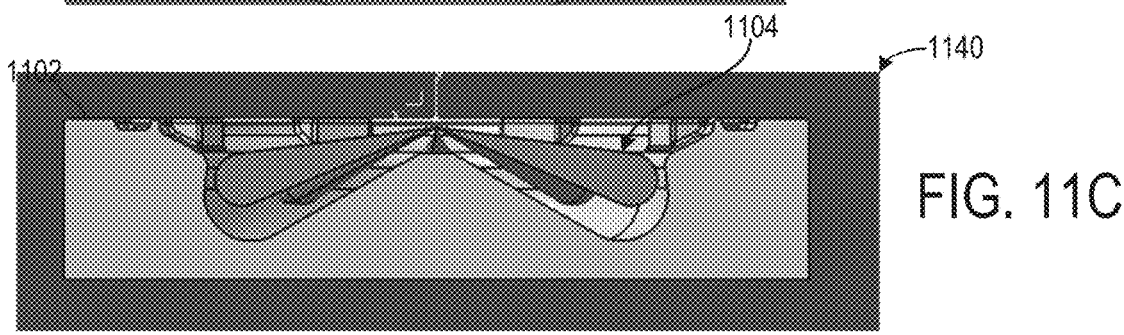
Figure 11D:
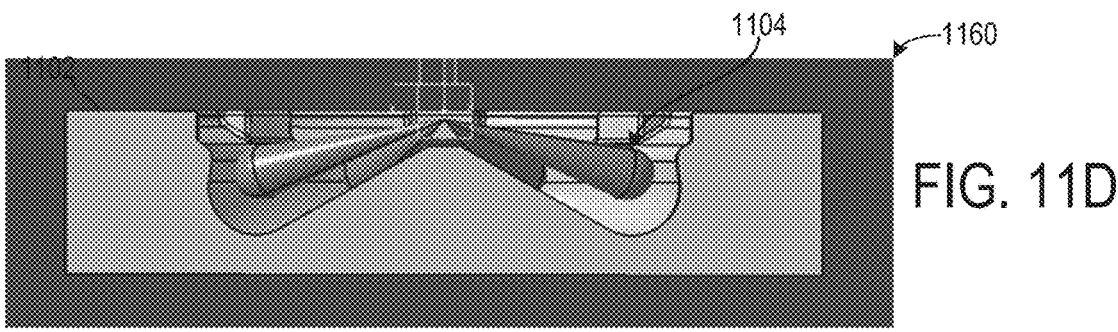
Figure 12A:
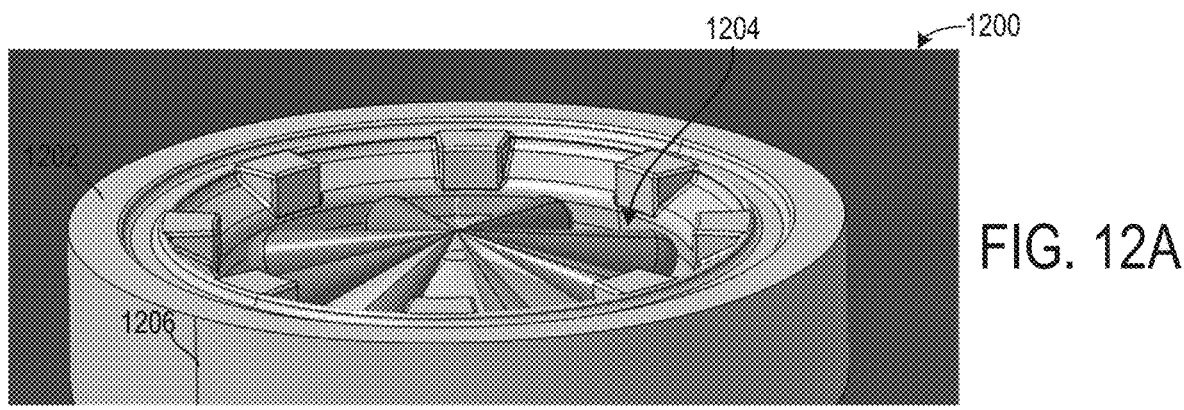
FIGS. 12A, 12B, 12C, and 12D show additional views of a piston interacting with a plurality of fuel sprays.
Figure 12B:
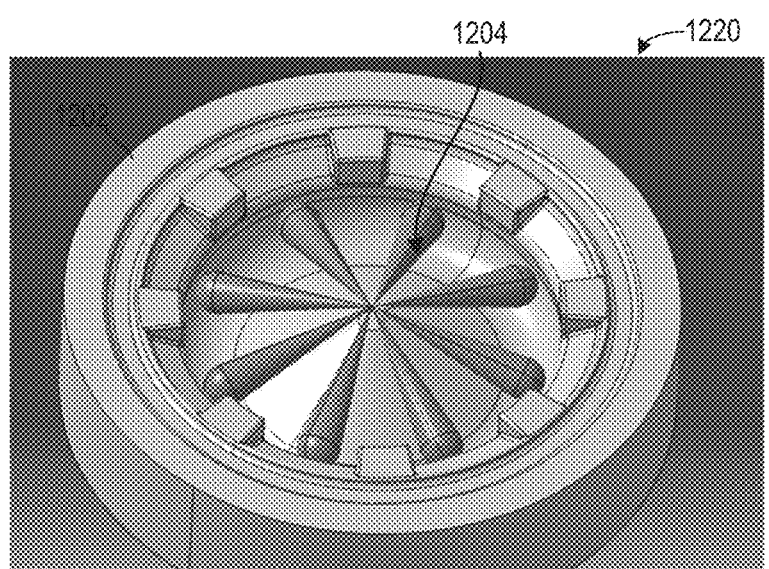
Figure 12C:
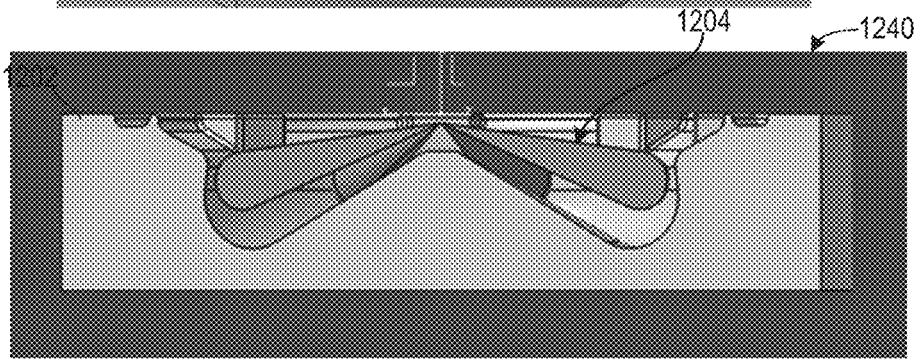
Figure 12D:
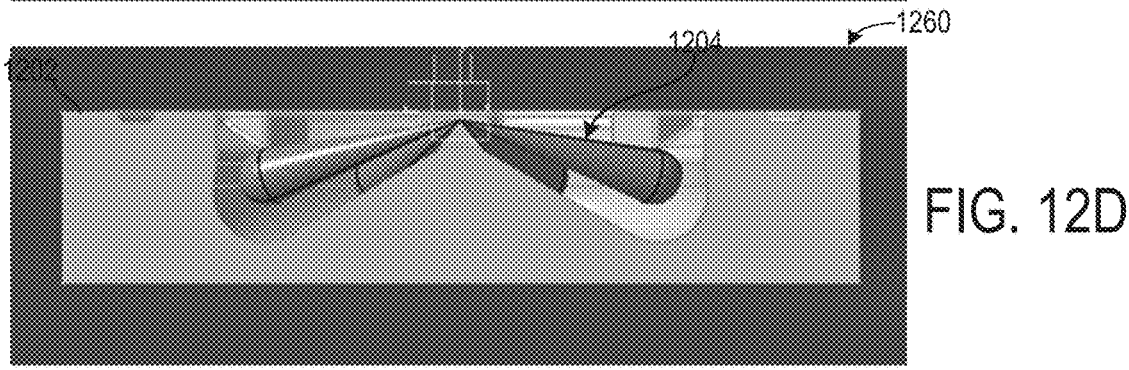

FIGS. 7A, 7B, 7C, 7D, and 7E each show various embodiments of a region of an outer rim of the piston comprising a differently shaped surface feature for increasing a vortex. FIG. 8 shows a view of the piston comprising each of the plurality of fins, plurality of protrusions, and surface features in the squish region interacting with a plurality of fuel sprays. FIGS. 9A-9D, 10A-10D, 11A-11D, 12A-12D, and 13A-13D show additional views of a piston interacting with a plurality of fuel sprays.

FIGS. 1-13D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that FIGS. 2B, 3B, 4B, 5B, and 6B show arrows indicating where there is space for gas to flow, and the solid lines of the device walls show where flow is blocked and communication is not possible due to the lack of fluidic communication created by the device walls spanning from one point to another. The walls create separation between regions, except for openings in the wall which allow for the described fluid communication.

Figure 1:
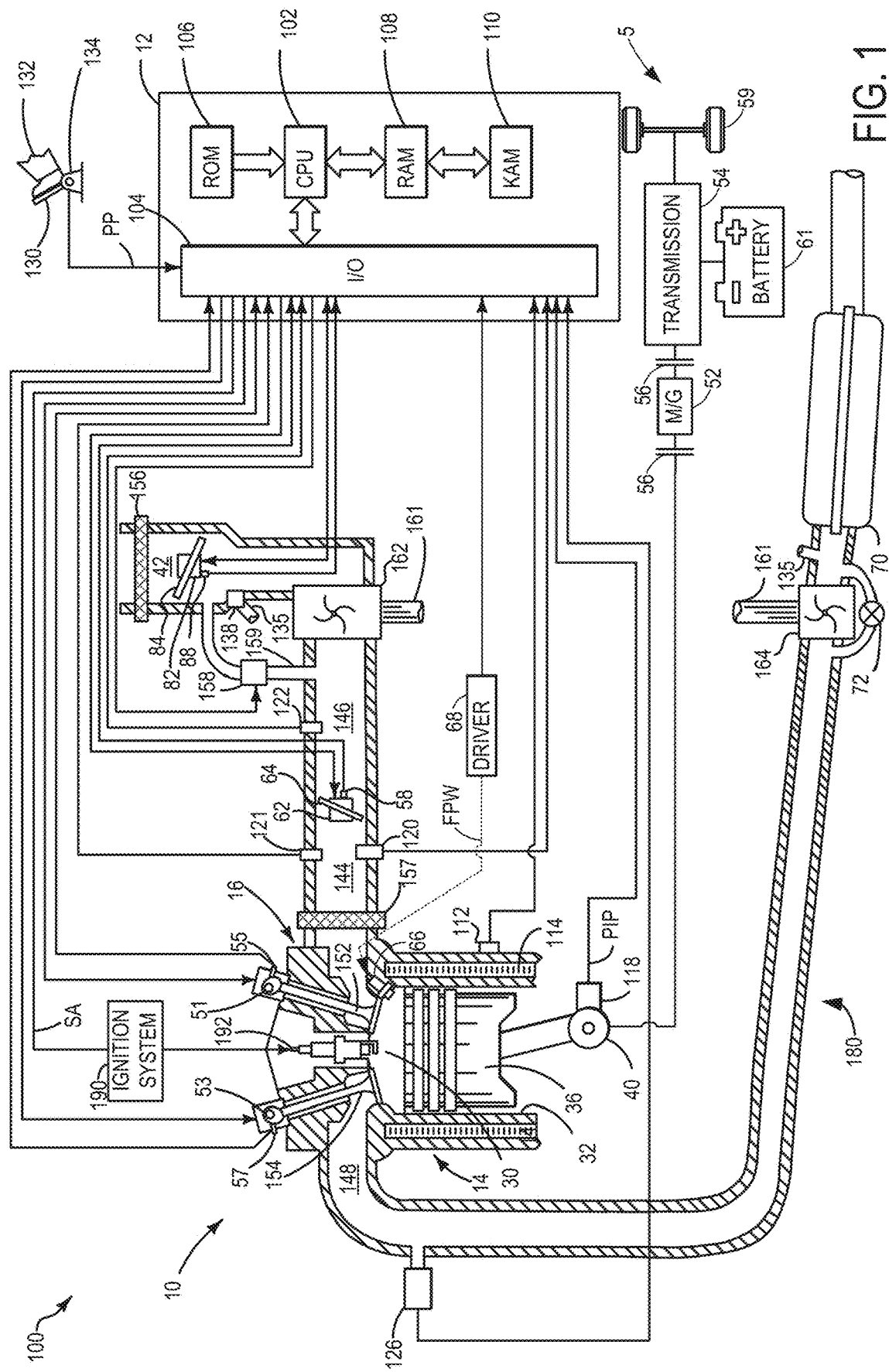
FIG. 1 shows a schematic of an engine included in a hybrid vehicle.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore 20 may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber 30. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used.

While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 59. Electric machine 52 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112. As will be described in greater detail below, the engine 10 and electric machine 52 may be adjusted such that their operations may be delayed based on one or more of a powertrain temperature, which may be estimated based on feedback from ECT sensor 112, and a distance between an intended destination and an electric-only operation range.

Turning now to FIG. 2A, it shows a first embodiment 200 of the piston 36. The first embodiment 200 of the piston 36 may be adapted to actuate along an axis 292, wherein the actuation may include a reciprocation and/or oscillation along the axis 292. The piston 36 may actuate between one or more walls of a combustion chamber (e.g., combustion chamber 30 of FIG. 1) defining a volume of the combustion chamber.

An axis system 290 comprising three axes, namely an x-axis parallel to a horizontal direction, a y-axis parallel to a vertical direction, and a z-axis perpendicular to each of the x- and y-axes. The axis 292 may be parallel to the y-axis and pass through a geometric center of the piston 36. Herein, axis 292 may be referred to as piston central axis 292. The piston central axis 292 may also correspond to a central axis of the combustion chamber.

A top side 212, which may also be referred to as a piston crown 212, of the piston 36 may correspond to a portion of the piston 36 coming into contact with combustion chamber gases and fluids. Herein, combustion chamber gases and fluids may be referred to as a combustion chamber mixture. The top side 212 may be separated from a bottom side 214 via side walls 216. The side walls 216 may be circular and correspondingly shaped to allow the piston 36 to reciprocate between combustion chamber walls while mitigating passage of a combustion chamber mixture between the combustion chamber walls and the side walls 216. In one example, the side walls 216 comprise recesses for elastic rings to be fitted into, wherein the rings may provide sealing contact to mitigate passage of gases and fluids. In this way, the side walls 216 may be in sealing contact with one or more combustion chamber walls while still allowing the piston 36 to oscillate between the combustion chamber walls.

The piston crown 212 may comprise a piston bowl 220 and a chamfered portion 221. The chamfered portion 221 may be radially outside of the piston bowl 220, distal to the piston central axis 292. The chamfered portion 221 may be angled relative to the piston central axis 292. Each of the piston bowl 220 and the chamfered portion 221 may comprise one or more surface features for direct a combustion chamber mixture to a desired region of the combustion chamber.

The piston bowl 220 may comprise a cone 222. The cone 222 may comprise a tip 224 and a base 226. The cone 222 may comprise an upper circumference corresponding to the tip 224 and a lower circumference corresponding to the base 226 of the cone 222. A surface of the cone 222 may extend linearly from the tip 224 to the base 226. The surface may be smooth and free of protrusions or indentations. It will be appreciated that the surface may comprise protrusions and/or indentations without departing from the scope of the present disclosure.

A circumference of the base 226 may be larger than a circumference of the tip 224. The base circumference may be equal to 2 to 20 times the circumference of the tip circumference. In some examples, the base circumference may be equal to 5 to 15 times the tip circumference. In one example, the base circumference is equal to 10 times the tip circumference.

The tip 224 may be a flat tip in some examples. The tip 224 may be circular, wherein a plane of the tip lies in an x-z plane perpendicular to the piston central axis 292. In some examples, the tip 224 may be a highest portion of the piston bowl 220, however, it will be appreciated that the tip 224 may not be the highest portion of the piston bowl 220 without departing from the scope of the present disclosure.

The piston 36 may further comprise a wall 228 which extends from the base 226 of the cone 222 to a piston bowl edge 232. The base 226 of the cone 222 may continuously extend to a radius (e.g., a portion of wall 228) of the piston bowl 220 outside a boundary of the cone 222, the radius corresponding to a lowest portion of the piston bowl 220. The wall 228 may extend from the bowl to the piston bowl edge 232 along a curved path partially extending in both a vertical direction along the y-axis and in radially outer direction along the x- and z-axes. In some examples, the wall 228 may extend more in the vertical direction than in the radially outer direction. In this way, the wall 228 may be closer to being parallel with the piston central axis 292 than to being perpendicular to the piston central axis 292.

The piston bowl edge 232 may define an outer circumference of the piston bowl 220. In one example, the piston bowl edge 232 may represent an interface between the piston bowl 220 and the chamfered portion 221. In some examples, the interface between the piston bowl 220 and the chamfered portion 221 may be continuous such that the piston bowl edge 232 is flush and there are no discontinuities between the piston bowl 220 and the inclined surface 234. The piston bowl edge 232 may be flush such that it does not protrude toward the piston central axis 292 or recess away from the piston central axis 292. Additionally or alternatively, the piston bowl edge 232 may not be flush. In one example, the piston bowl edge 232 may be shaped as an overhang, wherein the piston bowl edge 232 may protrude toward the piston central axis 292. In some examples, additionally or alternatively, the piston bowl edge 232 may be shaped to direct a combustion chamber mixture contacting it in a radially inward direction toward the piston central axis 292. By doing this, injection penetration may increase.

An inclined surface 234 may extend from the piston bowl edge 232 toward a first protrusion 236 in a radially outward direction in the chamfered portion 221. The inclined surface 234 may be angled, thereby generating the chamfer of the chamfered portion 221. The inclined surface 234 may be angled relative to the piston central axis 292, wherein the angle is less than 90 degrees. As such, the inclined surface 234 may be angled such that its orientation is between parallel (e.g., zero degrees) and perpendicular (e.g., 90 degrees). In some examples, the angle of the inclined surface 234 may be between 5 and 80 degrees. In some examples, the angle of the inclined surface 234 may be between 10 and 75 degrees. In some examples, the angle of the inclined surface 234 may be between 15 and 70 degrees. In some examples, the angle of the inclined surface 234 may be between 20 and 65 degrees. In some examples, the angle of the inclined surface 234 may be between 25 and 60 degrees. In some examples, the angle of the inclined surface 234 may be between 30 and 55 degrees. In some examples, the angle of the inclined surface 234 may be between 35 and 50 degrees. In some examples, the angle of the inclined surface 234 may be between 40 and 50 degrees. In one example, the angle of the inclined surface 234 is exactly 45 degrees relative to the piston central axis 292. In this way, the inclined surface 234 may simultaneously direct a combustion chamber mixture upward and radially outward without stagnating the combustion chamber mixture.

The first protrusion 236 may protrude from the inclined surface 234 in a direction parallel to the piston central axis 292. As such, the angle measured between the inclined surface 234 and the piston central axis 292 may be substantially similar to an angle measured between the inclined surface 234 and the first protrusion 236. In some examples, additionally or alternatively, the first protrusion 236 may protrude to or away from the piston central axis 292 such that the angle measured between the first protrusion 236 and the inclined surface 234 is less than or greater than the angle measured between the piston central axis 292 and the inclined surface 234.

The first protrusion 236 may be annular and extend around a single circumference of the piston 36 between an outer most circumference and an inner most circumference. The first protrusion 236 may be continuous and free of intervening components. The first protrusion 236 may extend along the y-axis such that its height is substantially equal to a maximum height of the chamfered portion 221.

A vortex promoting feature 238 may be arranged between the first protrusion 236 and the outer rim 240. In the example of FIG. 2A, the vortex promoting feature 238 may be annular and comprise a circumference equal to a circumference between a circumference of the first protrusion 236 and a circumference of the outer rim 240. In one example, the vortex promoting feature 238 illustrates material taken out of the squish region to promote formation of a vortex in the squish region outside of the chamfered portion 221. In one example, the vortex promoting feature 238 is an annular recess.

The vortex promoting feature 238 may be an indentation arranged in the piston 36 upstream of the outer rim 240 and downstream of the first protrusion 236. The vortex promoting feature 238 may comprise a square or other similar shapes. Examples of the vortex promoting feature are shown in greater detail below with respect to FIGS. 7A through 7E. The vortex promoting feature 238 may be continuous, as shown in the example of FIG. 2A, or may be discontinuous, where the iterations of the vortex promoting feature 238 are arranged at locations radially aligned with a fuel spray.

Turning now to FIG. 2B, it shows a cross-sectional view 250 of the piston 36 arranged in a combustion chamber (e.g., combustion chamber 30 of FIG. 1). The cross-sectional view 250 is shown in conjunction with a fuel spray and/or flame flow, as illustrated by arrows 252. Herein, the fuel spray and/or flame flow represent by arrows 252 may be referred to as combustion chamber mixture 252. It will be appreciated that the FIG. 2B merely shows one example of many possible examples of a combustion chamber mixture 252 interacting with surface features of the piston 36. For example, a fuel injection may be directed at various surface features of the piston 36 when the piston is at a first position, which may flow differently than a flame front interacting with the piston 36 at a second position.

The combustion chamber mixture 252 may be directed toward the piston bowl edge 232, where the combustion chamber mixture 252 may be split into two separate flows.

A first flow may flow toward the piston bowl 220 and a second flow may flow up toward the cylinder head.

The first flow may follow a contour of wall 228 before colliding with cone 222, wherein the cone 222 may redirect the first flow upward, toward the piston central axis 292 and/or the cylinder head 16.

The second flow may follow a contour of the inclined wall 234 toward the first protrusion 236, where the second flow may be directed toward the cylinder head 16. The vortex promoting feature 238 may enhance flow of the second flow in radially outward, therefore also enhance flow in inward direction.

Turning now to FIG. 3A, it shows a second embodiment 300 of the piston 36. The second embodiment 300 may be substantially similar to the first embodiment 200, except that the second embodiment 300 may comprise one or more surface features differing from surface features of the first embodiment 200.

The second embodiment 300 may be shaped similarly to the first embodiment 200 in that the cone 222, including the flat tip 224 and the base 226, the wall 228, the piston bowl edge 232, a portion of the inclined wall 234 between the piston bowl edge 232 and the first protrusion 236, and the outer rim 240 may substantially identical in size and shape. The second embodiment 300 may differ from the first embodiment 200 in that the second embodiment 300 may comprise a plurality of second protrusions 310 and a plurality of recesses 330 arranged between the first protrusion 236 and the outer rim 240.

The plurality of second protrusions 310 may extend from the first protrusion 236 to the outer rim 240. The plurality of second protrusions 310 may comprise an upstream edge 312, a downstream edge 314, a first side edge 316, and a second side edge 318. Each protrusion of the plurality of second protrusions 310 may be identical in size, shape, and orientation. The downstream edge 314 may be less defined than the upstream edge 312, the first side edge 316, and the second side edge 318 in some examples. In one example, the downstream edge 314 is flush and continuous with the outer rim 240.

The upstream edge 312 may be opposite from the downstream edge 314. Each of the upstream edge 312 and the downstream edge 314 may be arc-shaped. The upstream edge 312 may be in face-sharing contact with the first protrusion 334 and the downstream edge 314 may be in face-sharing contact with the outer rim 240.

In some examples, the upstream edge 312 may be similarly sized to the downstream edge 314, despite the upstream edge 312 being arranged along a smaller circumference of the piston bowl 220 than the downstream edge 314. In this way, each protrusion of the plurality of second protrusions 310 may comprise a substantially square or rectangle shaped surface 322. In some examples, additionally or alternatively, the surface 322 may be trapezoid or other similar shape without departing from the scope of the present disclosure if the upstream and downstream edges 312, 314 are differently shaped. As such, the upstream edge 312 and the downstream edge 314 may be differently sized in some embodiments.

The surface 322 may extend from the first protrusion 236 to the outer rim 240. The surface 322 may be flat and smooth. A plane along which the surface 322 lies in may be substantially perpendicular to the piston central axis 292 and the first protrusion 236. The surface 322 may be arranged at the maximum height of the chamfered portion 221 such that the maximum height may extend radially outward from the first protrusion 236, along the surface 322, and to an outer circumference of the outer rim 240.

The first side edge 316 and the second side edge 318 may be similarly sized and shaped. The first and second side edges 316, 318 may extend in radial directions perpendicular to the upstream and downstream edges 312, 314. In some examples, the first side edge 316 and the second side edge 318 may be shorter than the upstream and downstream edges 312, 314 such that each protrusion of the plurality of second protrusions 310 may comprise a rectangular shape. The upstream edge 312, downstream edge 314, first side edge 316, and second side edge 318 may define the surface 322.

Protrusions of the plurality of second protrusions 310 may be separated from one another via the plurality of recesses 330. In some examples, protrusions of the plurality of second protrusions 310 and recesses of the plurality of recesses 330 may alternate. As such, each protrusion of the plurality of second protrusions 310 may be sandwiched and/or flanked by two recesses of the plurality of recesses 330. Similarly, each recess of the plurality of recesses 330 may be sandwiched and/or flanked by two protrusions of the plurality of second protrusions 310.

Each recess of the plurality of recesses 330 may be identical in shape and size. Each recess of the plurality of recesses 330 may comprise a trough shape, wherein a cross-section of the recess may comprise a U-shape. Each recess of the plurality of recesses 330 may be convex relative to the bottom side 214 such that each recess may increase a volume of the combustion chamber relative to each protrusion of the plurality of second protrusions 310 and relative to a continuation of the inclined surface 234. In this way, a combustion chamber mixture, including a fuel spray and/or a flame front may enter each of the plurality of recesses 330 for some amount of time, which may increase a vortex generated, thereby increasing mixing.

In some examples, the plurality of recesses 330 may be substantially identical to the vortex promoting feature 238 of FIG. 2A, except that the plurality of recesses 330 are separated by the plurality of second protrusions 310. As such, the plurality of recesses 330 may be a discontinuous arrangement of the vortex promoting feature 238.

Each recess of the plurality of recesses 330 may comprise an upstream lip 332, a downstream lip 334, a first side wall 336, and a second side wall 338. The upstream lip 332 may be opposite the downstream lip 334. The upstream lip 332 may be in face-sharing contact with the first protrusion 236 and the downstream lip 334 may be face-sharing contact with the outer rim 240.

The upstream lip 332 of each recess of the plurality of recesses 330 combined with the upstream edge 312 of each protrusion of the plurality of second protrusions 310 may form an upstream circumference of the piston bowl 220 corresponding to the first protrusion 236. The downstream lip 334 of each recess of the plurality of recesses 330 combined with the downstream edge 314 of each protrusion of the plurality of second protrusions 310 may form a downstream circumference of the piston bowl 220 corresponding to the outer rim 240, wherein the downstream circumference is larger than and radially outside of the upstream circumference.

In the example of FIG. 3A, a length of the upstream lip 332 may be greater than a length of the upstream edge 312. Furthermore, a length of the downstream lip 334 may be greater than a length of the downstream edge 314. However, a length of each of the first side wall and second side walls 336, 338 may be substantially equal to a length of each of the first side edge and second side edge 316, 318 measured in a radial direction. As such, an area of each recess of the plurality of recesses 330 may be greater than an area of the surface 322 of each protrusion of the plurality of second protrusions 310. In this way, a volume of the combustion chamber may be minimally affected by the plurality of second protrusions 310.

The first side wall 336 may be a vertical wall substantially perpendicular to a base of a recess of the plurality of recesses 330. The first side wall 336 may comprise a height corresponding to a height of a protrusion of the plurality of second protrusions 310 such that the first side wall 336 is in face-sharing contact with the second side edge 318. The second side wall 338 may be a vertical wall substantially perpendicular to the base of a recess of the plurality of recesses 330. The second side wall 338 may be substantially similar to the first side wall 336 in shape and size. Thus, the second side wall 338 may comprise a height corresponding to a height of a protrusion of the plurality of second protrusions 310 such that the second side wall 338 is in face-sharing contact with the first side edge 316.

In some examples, additionally or alternatively, the plurality of recesses 330 may be omitted or differently shaped. For example, the plurality of recesses 330 may be a continuation of the inclined surface 234 downstream of the first protrusion 236 similar to the first embodiment 200 of FIG. 2A.

In one example, a fuel injection may be expelled from one or more fuel injector nozzle passages in a radially outward direction aligned to flow between each of the plurality of second protrusions 310. That is to say, the fuel injector may comprise a number of nozzle passages equal to a number of protrusions in the plurality of second protrusions 310, wherein each individual nozzle passage may be directed to a radial direction between adjacent protrusions of the plurality of protrusions 310. In one example, the plurality of second protrusions 310 may define radial zones which may be separated from one another via the plurality of second protrusions. As such, combustion chamber mixtures in separate radial zones may not mix until flowing out of the radial zone.

In some examples, additionally or alternatively, the plurality of second protrusions 310 may comprise eight protrusions. As such, there may be an equal number of recesses to allow the recesses and protrusions to alternate with one another. A fuel injection may flow between adjacent protrusions to a recess of a plurality of recesses, where a flow of the fuel injection may be directed upward and radially outward. Additionally, a vortex formed near the squish region above the outer rim 240 may increase relative to a piston surface without the plurality of recesses 330. It will be appreciated that there may be 7 or fewer or 9 or more protrusions without departing from the scope of the present disclosure.

Turning now to FIG. 3B, it shows a cross-sectional view 350 of a portion of the second embodiment 300. A combustion chamber mixture is shown via arrows 352 (herein, combustion chamber mixture 352). The combustion chamber mixture 352 may represent a fuel/air mixture and/or a flame flow and/or a fuel injection.

The combustion chamber mixture 352 may flow in a pattern similar to the combustion chamber mixture 252 of FIG. 2B. However, due to the inclusion of the plurality of second protrusions 310, the combustion chamber mixture 352 may be maintained within a radial zone such that azimuthal flow is blocked. More specifically, the combustion chamber mixture 352 may be directed to portions of the piston bowl edge radially misaligned with each protrusion of the plurality of second protrusions. As such, a protrusion of the plurality of second protrusions 310 is shown via a dashed line in the cross-section 350. The first flow of the combustion chamber mixture 352 flowing toward the piston bowl 220 may be unaffected by the plurality of second protrusions 310. However, the second flow of the combustion chamber mixture 352 flow toward the chamfered portion 221 may be maintained within a radial zone upon reaching the plurality of recesses 330. By blocking the second flow from flowing azimuthally, a momentum of the combustion chamber mixture 352 may be maintained in the radially outward direction such that a vortex formed may be increased relative to the vortex formed at FIG. 2B, which may promote increased mixing and decrease emissions (e.g., soot).

Turning now to FIG. 4A, it shows a third embodiment 400 of the piston 210. The third embodiment 400 may be substantially similar to the second embodiment 300, except that the third embodiment 400 may comprise one or more surface features differing from surface features of the second embodiment 300. The axis system 290 is reoriented to match an orientation of the perspective view shown in FIG. 4A. As such, the central axis 292 is still parallel to the y-axis.

More specifically, the third embodiment 400 may comprise a plurality of third protrusions 410 similar to the plurality of second protrusions 310 except that the plurality of third protrusions 410 may extend farther in a radial direction than the plurality of second protrusions 310. The plurality of third protrusions 410 may comprise an upstream edge 412, a downstream edge 414, a first side edge 416, and a second side edge 418. The upstream edge 412 may be opposite from the downstream edge 414. In one example, the downstream edge 414 may be substantially identical to the downstream edge 314 of FIG. 3A. The upstream edge 412 may different than the upstream edge 312 of FIG. 3A. In one example, the upstream edge 412 may be shorter in length than the upstream edge 312 of FIG. 3A. This may be due to the upstream edge 412 being arranged at a more upstream location than the upstream edge 312 of the plurality of second protrusions 310. As such, a difference between the lengths of the upstream edge 412 and the downstream edge 414 may be greater than a difference between the lengths of the upstream edge 312 and the downstream edge 314.

An upstream surface 420 may be in face-sharing contact with a radially outer portion of the wall 228. In one example, as the wall 228 extends in the vertical direction, it may transition to the upstream surface 420 of the plurality of third protrusions 410. The upstream surface 420 may extend from the wall 228 to the upstream edge 412. In some examples, a top surface 422, extending from the upstream edge 412 to the downstream edge 414, of the protrusion of the plurality of third protrusions 410 may be parallel to a plane parallel to the x- and z-axes. In one example, the top surface 422 is perpendicular to the upstream surface 420. In some examples, additionally or alternatively, the surface 422 may be angled relative to the plane parallel to the x- and z-axes.

The upstream surface 420 may extend vertically upward, parallel to the piston central axis 292 to the maximum height of the chamfered portion 221. In this way, the top surface 422 may be equal in height to the outer rim 240 and the first protrusion 236. In some examples, the upstream surface 420 may be angled to the piston central axis 292 while still extending to the maximum height of the chamfered portion 221. In some examples, an angle of the upstream surface 420 may be greater than, equal to, or less than the angle of the inclined surface 234.

In some examples, the upstream surface 420 may disrupt a continuity of the piston bowl edge 232 such that the piston bowl edge 232 does not overhang at portion of the piston 36 where the plurality of third protrusions 310 are present. Additionally or alternatively, in some embodiments, the plurality of third protrusions 410 may be arranged downstream of the piston bowl edge 232 such that the piston bowl edge 232 remains continuous.

Each protrusion of the plurality of third protrusions 410 may be separated from one another such that the first side edge 416 of a protrusion of the plurality of third protrusions 410 may be spaced away from the second side edge 418 of a different protrusion of the plurality of third protrusions 410. In one example, the first side edge 416 of a first protrusion of the plurality of third protrusions 410 is spaced away from the second side edge 418 of a second protrusion of the plurality of third protrusions 410. The protrusions of the plurality of third protrusions 410 may be separated by a combination of two or more of the inclined surface 234, the first protrusion 236, and a recess of the plurality of recesses 330. In this way, a length of the first side edge 416 and the second side edge 418 may be equal to a combined length of the inclined surface 234, the first protrusion 236, and a recess of the plurality of recesses 330. Additionally or alternatively, the plurality of recesses 330 may be omitted and the inclined surface 234 may extend downstream of the first protrusion 236.

Turning now to FIG. 4B, it shows a cross-section view 450 of a portion of the second embodiment 400. A combustion chamber mixture is shown via arrows 452 (herein, combustion chamber mixture 452). The combustion chamber mixture 452 may represent a fuel/air mixture and/or a flame flow and/or fuel injection. In one example, the combustion chamber mixture 452 is a fuel injection.

The combustion chamber mixture 452 may flow in a pattern similar to the combustion chamber mixture 352 of FIG. 3B. However, due to the difference in shape between the third embodiment 400 and the second embodiment 300 of FIGS. 3A and 3B, the combustion chamber mixture 452 may flow differently than the combustion chamber mixture 352 following the wall 228.

In one example, a fuel injector may be positioned to inject into the combustion chamber, wherein one or more fuel sprays expelled from the fuel injector may be directed in radial directions misaligned with the plurality of third protrusions 410. In this way, the fuel sprays expelled from the fuel injector may flow within radial zones defined and separated by the plurality of third protrusions 410 such that a momentum of the fuel spray is maintained in the radially outer direction and less likely to flow in a circumferential direction. This may promote more even distribution and mixing of the fuel spray with combustion chamber gases. The fuel spray (e.g., combustion chamber mixture 452) may not mix with other portions of fuel spray flowing in different radial zones. Thus, the fuel sprays may mix upon reaching a squish region or other region outside of the radial zones.

For example, the combustion chamber mixture 452 may be directed toward the piston bowl edge 232 where it splits into a first flow which flows to the piston bowl 220 and a second flow which flows to the chamfered portion 221. The second flow may be maintained with a single radial zone, wherein azimuthal flow is blocked via the plurality of third protrusions 410 for an entire flow along the chamfered portion. Once the second flow collides with the first protrusions 236, it may flow up toward the cylinder head 16 and generate vortices in the radially inward and outward directions due to the plurality of recesses 330. In this way, each radial zone comprises a recess of the plurality of recesses 330, wherein the radial zone may be at least partially defined by adjacent protrusions of the plurality of third protrusions 410.

Turning now to FIG. 5A, it shows a fourth embodiment 500 of the piston 36. The fourth embodiment 500 may be substantially similar to the second embodiment 300, except that a plurality of fourth protrusions 510 are arranged in a more upstream location than the plurality of second protrusions 310 of the second embodiment 300.

In one example, the plurality of fourth protrusions 510 are equal to a difference between the plurality of second protrusions 310 of FIG. 3A and the plurality of third protrusions 410 of FIG. 4A. As such, the plurality of fourth protrusions 510 may comprise an upstream wall 520 extending vertically upward from the wall 228. The upstream wall 520 may be substantially identical to the upstream surface 420. Thus, the upstream wall 520 may be arranged along a plane parallel to the piston central axis 292.

The plurality of fourth protrusions 510 may comprise an upstream edge 512, a downstream edge 514, a first side edge 516, and a second side edge 518. The upstream edge 512 may be in face-sharing contact with the upstream wall 520. The downstream edge 514 may be in face-sharing contact with the first protrusion 236. The downstream edge 514 may be coplanar with the upstream edge 512, where each of the upstream edge 512 and the downstream edge 514 may intersect with the first side edge 516 and the second side edge 518 at opposite extreme ends. As such, each of the upstream edge 512, the downstream edge 514, the first side edge 516, and the second side edge 518 may define a top surface 522 of a protrusion of the plurality of fourth protrusions 510. In one example, the top surface 522 may be positioned along a plane at the maximum height, such that the plurality of fourth protrusions 510 may be equal in height to the first protrusion 236 and the outer rim 240.

Each protrusion of the plurality of fourth protrusions 510 may be spaced apart from other protrusions of the plurality of fourth protrusions 510, wherein the protrusions are separated by and define radial zones. The piston bowl edge 232, the inclined surface 234, and the first protrusion 236 may constitute the radial zone. The plurality of fourth protrusions 510 may be arranged symmetrical and be evenly distributed along the piston 36 such that each of the radial zones is similarly sized and spaced.

Turning now to FIG. 5B, it shows a cross-section 550 of the fourth embodiment 500. The cross-section 550 may be shown in conjunction with a combustion chamber mixture 552 interacting with one or more surface features of the fourth embodiment 500. The combustion chamber mixture 552 may be represented by arrows, wherein the combustion chamber mixture may include a fuel spray, a fuel/air mixture, and/or a flame front. Similar to the second and third embodiments 300, 400, the combustion chamber mixture 552 may be directed along a radially outwardly direction misaligned with the plurality of fourth protrusions 510.

In one example, if the combustion chamber mixture 552 is a fuel spray. A fuel injector positioned to inject into the combustion chamber may inject fuel through a plurality of fuel injector nozzle passages, wherein the fuel spray may be directed to flow through the radial zones. The plurality of fourth protrusions 510 may block the fuel spray from flowing out of the radial zones azimuthally. In this way, momentum of the fuel spray may be maintained in the radial direction.

Turning now to FIG. 6A, it shows a fifth embodiment 600 of the piston 36. The fifth embodiment 600 may be substantially similar to the first embodiment 200, except that a plurality of fins 610 are arranged in the fifth embodiment 500. The plurality of fins 610 may extend from a portion of the cone 222, adjacent to the flat tip 224, to the piston bowl edge 232.

Each fin of the plurality of fins 610 may comprise a top portion 612 extending from the cone 222 to the piston bowl edge 232. The top portion 612 may be flat. The top portion 612 may be arranged at a height equal to a maximum height of the piston bowl 220, in some examples. A lower portion 614 may be physically coupled to the top portion 612 at extreme ends of each fin of the plurality of fins 610 adjacent to the flat tip 224 and the piston bowl edge 232. The lower portion 614 may be in face-sharing contact with surfaces of each of the cone 222 and the wall 228. As such, the lower portion 614 may follow a contour of each of the cone 222 and the wall 228. In this way, the lower portion 614 may extend radially outward, while fluctuating an amount it extends along a vertical axis parallel to the piston central axis 292. In one example, the top portion 612 comprises a rectangular shape and the lower portion 614 comprise an arc shape. A fin of the plurality of fins 610 may comprise a D-shape, a bow-shape, or the like.

In some examples, a fin of the plurality of fins 610 may comprise rectilinear shape and/or a curved shape, wherein a magnitude of the curve may be adjusted. For example, the curve may be a narrow curve or a wide curve, wherein a narrow curve fin may more closely resemble a rectilinear fin than a wide curve fin. Additionally or alternatively, heights and angles of the fins may be adjusted. For example, a height of a fin may go up to the chamfered portion 221. Additionally or alternatively, a fin may be angled relative to a piston surface and/or to a fuel spray flow path. The angle may be such that a fuel spray may contact a fin of a pair of fins defining a radial zone. The angle may be less than or equal to 45 degrees.

Each fin may further comprise a first side wall 616 and a second side wall 618, wherein the side walls are arranged opposite one another on opposite sides of the top portion 612 and the lower portion 614. In this way, each of the top portion 612, the lower portion 614, the first side wall 616, and the second side wall 618 may define each fin of the plurality of fins 610. Each fin may be impervious to fluid flow such that neither gases nor liquids may enter the fin.

The plurality of fins 610 may be symmetrically spaced about the piston bowl 220. Radial zones may be arranged between adjacent fins of the plurality of fins 610 wherein the adjacent fins define boundaries of the radial zones. A combustion chamber mixture in a radial zone may not mix with a combustion chamber mixture in a different radial zone.

In some examples, a fuel injector may be positioned to inject fuel as a fuel spray in a direction radially misaligned with the plurality of fins 610. The fuel sprays may be misaligned with the plurality of fins 610 such that the plurality of fins 610 may contain the fuel spray to a radial zone as will be described in greater detail below.

Turning now to FIG. 6B, it shows a cross-section 650 of a portion of the fifth embodiment 600. The cross-section 650 is shown interacting with a combustion chamber mixture 652, wherein the combustion chamber mixture 652 may illustrate a fuel injection, a fuel/air mixture, and/or a flame front.

The combustion chamber mixture 652 is a fuel injection in once example. The combustion chamber mixture 652 is directed toward the piston bowl edge 232, where it splits into a first flow and a second flow. The first and second flows may flow similarly to the flow described with respect to FIG. 2B. However, the plurality of fins 610 may block the first flow from flowing azimuthally within the piston bowl 220 such that a momentum of the first flow is maintained in a radially inward direction. By doing this, a vortex generated by the first flow may be increased relative to a vortex generated with respect to FIG. 2B.

In this way, FIGS. 2A through 6A show a variety of embodiments of a piston comprising surface features for enhancing combustion chamber conditions. The piston may comprise one or more of the plurality of second protrusions 310, the plurality of third protrusions 410, the plurality of fourth protrusions 510, and the plurality of fins 610. In one example, a piston comprises the plurality of fins 610 and one of the plurality of second protrusions 310, the plurality of third protrusions 410, and the plurality of fourth protrusions 510. Fuel injections arranged within the radial zones may not mix with one another, due to azimuthal flow being blocked, until flowing out of their respective zones. This may promote the fuel injection to reach a greater volume of the combustion chamber than if azimuthal flow was allowed or if vortices formed near the outer rim were smaller. A combination of the surface features arranged on the piston may promote a fuel spray momentum in a desired direction to decrease fuel pocket formation, increase fuel air mixing, expand a flame front, and increase engine power output.

Turning now to FIGS. 7A-7E, it shows a plurality of embodiments for the vortex promoting feature 238 and/or the plurality of recesses 330 of the piston 36. The embodiments may be shaped to increase a vortex generated in the squish region adjacent the outer edge, wherein by increasing the vortex, fuel/air mixing may increase. Furthermore, the vortex generated in a radially inward direction may also increase, which may promote further mixing. An area between the bottom of squish and the piston 36 is illustrated in a striped pattern to illustrate a shape of the vortex promoting feature 238.

In one example, the first and second embodiments 700, 710 may relate to a piston comprising a wider outer rim, wherein the outer rim may be angled (e.g., the first embodiment) or flat (e.g., the second embodiment). The outer rim may be wider relative to previous example of piston bowls. By increasing a width of the outer rim, vortices formed in the radially inward and radially outward directions may increase.

A third embodiment 720 of one or more of the vortex promoting feature 238 and the plurality of recesses may comprise a square-shaped dip 724 downstream of the first protrusion 236. In one example, the third embodiment 720 is substantially identical to the first embodiment 200 of FIG. 2A.

A fourth embodiment 730 may comprise where the first protrusion 236 and to the vortex promoting feature 238 are more curved relative to the third embodiment 720. In one example, the first protrusion 236 may protrude in a first direction toward a cylinder head and the vortex promoting feature 238 may recess away from the cylinder head. As such, a combination of the first protrusion 236 and the vortex promoting feature 238 may comprise a sine-wave shape.

A fifth embodiment 740 may comprise where the first protrusion 236 is arranged at a more radially outward location of the chamfered surface 234 relative to the third embodiment 720. Additionally, the vortex promoting feature 238 and the first protrusion 236 may be curved similar to the fourth embodiment 730. However, a magnitude of the curvature in the fifth embodiment 740 may be less than a magnitude of the curvature in the fourth embodiment 730.

Turning now to FIG. 8, it shows an embodiment 800 of the piston 36 comprising one or more of the surface features previously described. More specifically, the embodiment 800 of the piston 36 may comprise the plurality of fins 610, the plurality of fourth protrusions 510, the first protrusion 236, and vortex promoting feature 238. The embodiment 800 further illustrates a plurality of fuel sprays 810 interacting with one or more of the plurality of fins 610 and the plurality of fourth protrusions 510. As shown, a fin of the plurality of fins 610 may comprise a radial length, measured from a piston center, greater than a radial length of the protrusion of the plurality of fourth protrusions 510.

More specifically, the plurality of fuel sprays 810 comprises a first fuel spray 810A, a second fuel spray 810B, a third fuel spray 810C, a fourth fuel spray 810D, a fifth fuel spray 810E, a sixth fuel spray 810F, a seventh fuel spray 810G, and an eighth fuel spray 810H. The first fuel spray 810A may be directed to a first radial zone 820A of a plurality of radial zones 820. The second fuel spray may be directed to a second radial zone 820B. The third fuel spray 810C may be directed to a third radial zone 820C. The fourth fuel spray 810D may be directed to a fourth radial zone 820D. The fifth fuel spray 810E may be directed to a fifth radial zone 820E. The sixth fuel spray 810F may be directed to a sixth radial zone 820F. The seventh fuel spray 810G may be directed to a seventh radial zone 820G. The eighth fuel spray 810H may be directed to an eighth radial zone 820H.

Each radial zone of the plurality of radial zones 820 may be at least partially defined by a combination of adjacent fins of the plurality of fins 610 and adjacent protrusions of the plurality of fourth protrusions 510. More specifically, the first radial zone 820A may be defined by a first fin 610A, an eighth fin 610H, a first protrusion 510A, and an eighth protrusion 510H. The second radial zone 820B may be defined by the first fin 610A, the first protrusion 510A, a second fin 610B, and a second protrusion 510B. The third radial zone 820C may be defined by the second fin 610B, the second protrusion 510B, a third fin 610C, and a third protrusion 510C. The fourth radial zone 820D may be defined by the third fin 610C, the third protrusion 510C, a fourth fin 610D, and a fourth protrusion 510D. The fifth radial zone 820E may be defined by the fourth fin 610D, the fourth protrusion 510D, a fifth fin 610E, and a fifth protrusion 510E. The sixth radial zone 820F may be defined by the fifth fin 610E, the fifth protrusion 510E, a sixth fin 610F, and a sixth protrusion 510F. The seventh radial zone 820G may be defined by the sixth fin 610F, the sixth protrusion 510F, a seventh fin 610G, and a seventh protrusion 510G. The eighth radial zone 820H may be defined by the seventh fin 610G, the seventh protrusion 510G, the eighth fin 610H, and the eighth protrusion 510H. As such, individual fins may be radially aligned with individual protrusions to fluidly separate adjacent radial zones.

Each radial zone may be fluidly separated from other radial zones. For example, the first radial zone 820A is fluidly separated from each of the remaining radial zones of the plurality of radial zones 820. As such, the first fuel spray 810A may not mix with the other fuel sprays while in the first radial zone 820A. In this way, the plurality of fins 610 and the plurality of fourth protrusions 510 may be impervious to fluid and gas flows. By maintaining the fuel spray within a single radial zone, a momentum of the fuel spray may be maintained in a radial direction parallel to the single radial zone.

The first protrusion 236 and the vortex promoting feature 238 may be arranged radially downstream of the plurality of fourth protrusions 510. The first protrusion 236 and the vortex forming feature 238 are shown as being continuous. However, it will be appreciated that the first protrusion 236 and/or the vortex forming feature 238 may be discontinuous and arranged only within the radial zones, in some examples.

Turning now to FIGS. 9A, 9B, 9C, and 9D, they show a plurality of views 900, 920, 940, and 960, respectively, of an embodiment of a piston 902 receiving a plurality of fuel injections 904. The views may be grey-scale illustrations of CAD drawings and as such, certain lines, such as line 906, may be artifacts of the CAD drawing appearing to illustrate a contour and/or other curvature of the piston 902. In one example, the piston 902 may be substantially identical to the first embodiment 200 of FIG. 2A. The view 940 may illustrate a cross-section of the piston radially aligned with a fuel injection of the plurality of fuel injections 904. As such, the view 960 may illustrate a cross-section of the piston radially misaligned with a fuel injection of the plurality of fuel injections 904.

Turning now to FIGS. 10A, 10B, 10C, and 10D, they show a plurality of views 1000, 1020, 1040, and 1060, respectively, of an embodiment of a piston 1002 receiving a plurality of fuel injections 1004. The views may be grey-scale illustrations of CAD drawings and as such, certain lines, such as line 1006, may be artifacts of the CAD drawing appearing to illustrate a contour and/or other curvature of the piston 1002. In one example, the piston 1002 may be substantially identical to the second embodiment 300 of FIG. 3A. The view 1040 may illustrate a cross-section of the piston radially aligned with a fuel injection of the plurality of fuel injections 1004. As such, view 1060 may illustrate a cross-section of the piston 1002 radially misaligned with the fuel injection of the plurality of fuel injection 1004.

Turning now to FIGS. 11A, 11B, 11C, and 11D, they show a plurality of views 1100, 1120, 1140, and 1160, respectively, of an embodiment of a piston 1102 receiving a plurality of fuel injections 1104. The views may be grey-scale illustrations of CAD drawings and as such, certain lines, such as line 1106, may be artifacts of the CAD drawing appearing to illustrate a contour and/or other curvature of the piston 1102. In one example, the piston 1102 may be substantially identical to the third embodiment 400 of FIG. 4A. The view 1140 may illustrate a cross-section of the piston radially aligned with a fuel injection of the plurality of fuel injections 1104. As such, view 1160 may illustrate a cross-section of the piston 1102 radially misaligned with the fuel injection of the plurality of fuel injection 1104.

Turning now to FIGS. 12A, 12B, 12C, and 12D, they show a plurality of views 1200, 1220, 1240, and 1260, respectively, of an embodiment of a piston 1202 receiving a plurality of fuel injections 1204. The views may be grey-scale illustrations of CAD drawings and as such, certain lines, such as line 1206, may be artifacts of the CAD drawing appearing to illustrate a contour and/or other curvature of the piston 1202. In one example, the piston 1202 may be substantially identical to the fourth embodiment 500 of FIG. 5A. The view 1240 may illustrate a cross-section of the piston radially aligned with a fuel injection of the plurality of fuel injections 1204. As such, view 1260 may illustrate a cross-section of the piston 1202 radially misaligned with the fuel injection of the plurality of fuel injection 1204.

Turning now to FIGS. 13A, 13B, 13C, and 13D, they show a plurality of views 1300, 1320, 1340, and 1360, respectively, of an embodiment of a piston 1302 receiving a plurality of fuel injections 1304. The views may be grey-scale illustrations of CAD drawings and as such, certain lines, such as line 1306, may be artifacts of the CAD drawing appearing to illustrate a contour and/or other curvature of the piston 1302. In one example, the piston 1302 may be substantially identical to the fifth embodiment 600 of FIG. 6A. The view 1340 may illustrate a cross-section of the piston radially aligned with a fuel injection of the plurality of fuel injections 1304. As such, view 1360 may illustrate a cross-section of the piston 1302 radially misaligned with the fuel injection of the plurality of fuel injection 1304.

In this way, a piston may comprise a plurality of differently shaped surface features arranged at different radial locations to promote fuel spray penetration, air/fuel mixing, and flame front expansion. A plurality of fins and/or protrusions may maintain a fuel spray momentum in a radial zone to allow other surface features of the piston to redirect the fuel spray toward a piston central axis or above an outer rim of the piston. The piston may comprise a variety of shapes in its squish region and/or outer rim region, which may promote vortex formation in radially inward and radially outward directions, which may decrease soot formation by increasing mixing and penetration. The technical effect of providing the one or more surface features to the piston is to improve combustion conditions. Fuel injectors may be prone to degradation and may be expensive to manufacture. By providing a piston which may improve combustion conditions independent of the injector, manufacturing costs may decrease and reliability may increase. Furthermore, fuel efficiency may increase and emissions may decrease due to shape of the piston and its effect on fuel spray and combustion patterns.

In another representation, an embodiment of a system comprises an engine comprising at least one combustion chamber and an injector positioned to inject directly therein and a piston positioned to oscillate within the combustion chamber, the piston comprising an annular recess arranged adjacent to and radially inward of an outer rim of the piston and a plurality of first protrusions arranged in the annular recess, spaced apart from one another within the annular recess, and defining radial zones to confine injections of the injector. A first example of the system further comprises where the plurality of first protrusions is shaped to confine the injection between adjacent protrusions along a shared circumference to direct the injection toward a portion of the annular recess. A second example of the system, optionally including the first example, further comprises where the plurality of first protrusion are arranged in a chamfered portion of the piston, further comprising a plurality of second protrusions arranged in a piston bowl. A third example of the system, optionally including the first and/or second examples, further includes where the injections are directed at an interface between the chamfered portion and the piston bowl, wherein the injections split into a first flow directed to the piston bowl and a second flow directed to the chamfered portion. A fourth example of the system, optionally including one or more of the first through third examples, further includes where each first protrusion of the plurality of first protrusions is block-shaped with large radius fillets and where each second protrusion of the plurality of second protrusions is bow-shaped. A fifth example of the system, optionally including one or more of the first through fourth examples, further includes where the plurality of first and second protrusions are impervious to fluids. A sixth example of the system, optionally including one or more of the first through fifth examples, further includes where the injector is shaped to inject multiple sprays, and where a first spray is confined in a first radial zone and a second spray is confined in a second radial zone, and where the first spray and the second spray do not mix in the radial zones. A seventh example of the system, optionally including one or more of the first through sixth examples, further includes where the plurality of first protrusions is radially spaced away from the plurality of second protrusions relative to a central axis of the piston. An eighth example of the system, optionally including one or more of the first through seventh examples, further includes where the plurality of first protrusions is vertically spaced away from the plurality of second protrusions, where the upper, chamfered region is raised relative to the piston bowl.

An embodiment of a system comprising an engine comprises at least one combustion chamber and an injector positioned to inject directly therein and a piston comprising a piston bowl edge at which at least one fuel spray from the injector is directed, and where the piston is chamfered from the piston bowl edge to an outer rim, the piston comprising an annular recess arranged adjacent to the outer rim, and where the annular recess is positioned radially inward of the outer rim relative to a central axis of the piston, the annular recess comprising an upstream edge equal in height to a downstream edge. A first example of the system further includes where the annular recess is continuous and uninterrupted and extends around an entire circumference of the piston. A second example of the system, optionally including the first example, further includes where a plurality of protrusions intersecting portions of the annular recess, wherein each protrusion of the plurality of protrusions is spaced apart along the annular recess defining radial zones to confine injections of the injector. A third example of the system, optionally including the first and/or second examples, further includes where the plurality of protrusions is shaped to confine a fuel spray of the injector to a radial zone of a plurality of radial zones, the radial zone defined by adjacent protrusions of the plurality of protrusions. A fourth example of the system, optionally including one or more of the first through third examples, further includes where each protrusion of the plurality of protrusions extends from a chamfered portion of the piston to the annular recess. A fifth example of the system, optionally including one or more of the first through fourth examples, further includes where a plurality of fins arranged in a piston bowl, the plurality of fins arranged in a portion of the piston below a piston bowl edge where one or more fuel sprays from the injector are directed. A sixth example of the system, optionally including one or more of the first through fifth examples, further includes where the plurality of fins is shaped to confine each fuel spray of the one or more fuel sprays from the injector to a radial zone of a plurality of radial zones, the radial zone defined by adjacent fins of the plurality of fins. A seventh example of the system, optionally including one or more of the first through sixth examples, further includes where the radial zones are fluidly separated from one another. An eighth example of the system, optionally including one or more of the first through seventh examples, further includes where the annular recess, having the upstream edge that is parallel to the central axis, splits a fuel spray from the fuel injector into a first flow directed toward a piston central axis in a radially inward direction and a second flow directed toward the outer rim in a radially outward direction and wherein the upstream edge is positioned radially inward of the downstream edge relative to the central axis.

An embodiment of a piston, comprises a piston bowl interfacing with a chamfered portion at a piston bowl edge, a first protrusion of a plurality of first protrusions extending from a piston center to the piston bowl edge and a second protrusion of a plurality of second protrusions extending between the piston bowl edge to a maximum height of the piston, wherein the plurality of first protrusions and the plurality of second protrusions are radially aligned. A first example of the piston further includes where the plurality of first protrusions and the plurality of second protrusions are angled relative to an angle of injection of a fuel injector positioned to inject toward the piston so that a flow path of fuel from the fuel injector extends radially outward, between adjacent protrusions of the plurality of first protrusions and the plurality of second protrusion, and wherein the plurality of first and second protrusions are radially aligned relative to a central axis of the piston at the piston center. A second example of the piston, optionally including the first example, further includes where one or more of the plurality of first protrusions and the plurality of second protrusions have a width, in a direction perpendicular to a radial direction and the central axis, that increases from the central axis and in a radially outward direction and where one or more of the plurality of first protrusions and the plurality of second protrusions protrude perpendicularly to the central axis. A third example of the piston, optionally including the first and/or second examples, further includes where the plurality of first protrusions is completely below and spaced away from the plurality of second protrusions relative to a vertical direction aligned in parallel with a central axis of the piston at the piston center. A fourth example of the piston, optionally including one or more of the first through third examples, further includes where the plurality of second protrusions traverse an entire range between the piston bowl edge to the maximum height of the piston, wherein the maximum height corresponds to an outer rim of the piston. A fifth example of the piston, optionally including one or more of the first through fourth examples, further includes where the plurality of second protrusions extend from the piston bowl edge to an annular protrusion, the annular protrusion traversing a circumference of the piston between the piston bowl edge and an outer rim. A sixth example of the piston, optionally including one or more of the first through fifth examples, further includes where the plurality of second protrusions are radially spaced away from the piston bowl edge, and where the plurality of second protrusions extend from an annular protrusion to an outer rim of the piston, wherein the annular protrusion traverses a circumference of the piston between the piston bowl edge and the outer rim. A seventh example of the piston, optionally including one or more of the first through sixth examples, further includes where each protrusion of the plurality of second protrusions is separated from adjacent protrusions of the plurality of second protrusions via a recess, and where the recess comprises a U-shape cross-section in a radial direction.

An embodiment of an engine, comprises at least one combustion chamber comprising a fuel injector positioned to inject fuel therein and a piston comprising one or more surface features shaped to interact with a fuel injection from the fuel injector, the one or more surface features comprising a plurality of first protrusions arranged in a piston bowl extending from a maximum height of the piston bowl to an outer edge of the piston bowl, wherein the maximum height corresponds to a tip of a cone centered along a central axis of the piston, a plurality of second protrusions arranged in a chamfered portion of the piston radially outside of the piston bowl, the plurality of second protrusions extending between the outer edge and an outer rim of the piston, wherein the outer rim corresponds to a maximum height of the piston, and where the outer rim is arranged higher than the tip of the cone, and one or more squish features arranged in the outer rim, wherein the one or more squish features are shaped to increase a vortex size adjacent the outer rim. A first example of the engine further comprises where a radial length of the plurality of first protrusions is greater than a radial length of the plurality of second protrusions, wherein the radial length is measured from a piston central axis to an outer circumference, and where a cross-section of the plurality of first protrusions taken in a radial direction is bow-shaped. A second example of the engine, optionally including the first example, further comprises where each of the plurality of first protrusions, the plurality of second protrusions, and the one or more squish features are spaced apart from one another, and where one or more of the plurality of first protrusions, the plurality of second protrusions, and the one or more squish features are radially aligned.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine comprising at least one combustion chamber and an injector positioned to inject directly therein; and
a piston comprising a piston bowl edge at which at least one fuel spray from the injector is directed, where the piston is chamfered from the piston bowl edge to an outer rim, the piston comprising an annular recess arranged adjacent to the outer rim, where the annular recess is positioned radially inward of the outer rim relative to a central axis of the piston, the annular recess comprising an upstream edge equal in height to a downstream edge, wherein a plurality of fins is arranged in a piston bowl defined by the piston bowl edge, the plurality of fins arranged in a portion of the piston below the piston bowl edge where one or more fuel sprays from the injector are directed.

2. The system of claim 1, wherein the annular recess is continuous and uninterrupted and extends around an entire circumference of the piston.

3. The system of claim 1, wherein the plurality of fins is shaped to confine each fuel spray of the one or more fuel sprays from the injector to a radial zone of a plurality of radial zones, the radial zone defined by adjacent fins of the plurality of fins.

4. The system of claim 3, wherein the radial zones are fluidly separated from one another.

5. A system, comprising:
an engine comprising at least one combustion chamber and an injector positioned to inject directly therein; and
a piston comprising a piston bowl edge at which at least one fuel spray from the injector is directed, where the piston is chamfered from the piston bowl edge to an outer rim, the piston comprising an annular recess arranged adjacent to the outer rim, where the annular recess is positioned radially inward of the outer rim relative to a central axis of the piston, the annular recess comprising an upstream edge equal in height to a downstream edge, and a plurality of protrusions intersecting portions of the annular recess, wherein each protrusion of the plurality of protrusions is spaced apart along the annular recess defining radial zones to confine injections of the injector.

6. The system of claim 5, wherein the plurality of protrusions is shaped to confine a fuel spray of the injector to a radial zone of a plurality of radial zones, the radial zone defined by adjacent protrusions of the plurality of protrusions.

7. The system of claim 5, wherein each protrusion of the plurality of protrusions extends from a chamfered portion of the piston to the annular recess.

8. A system, comprising:
an engine comprising at least one combustion chamber and an injector positioned to inject directly therein; and
a piston comprising a piston bowl edge at which at least one fuel spray from the injector is directed, where the piston is chamfered from the piston bowl edge to an outer rim, the piston comprising an annular recess arranged adjacent to the outer rim, where the annular recess is positioned radially inward of the outer rim relative to a central axis of the piston, the annular recess comprising an upstream edge equal in height to a downstream edge, wherein the annular recess, having the upstream edge that is parallel to the central axis of the piston, splits a fuel spray from the injector into a first flow directed toward the central axis of the piston in a radially inward direction and a second flow directed toward the outer rim in a radially outward direction, and wherein the upstream edge is positioned radially inward of the downstream edge relative to the central axis of the piston.

9. A piston, comprising:
a piston bowl interfacing with a chamfered portion at a piston bowl edge, a first protrusion of a plurality of first protrusions extending from a piston center to the piston bowl edge and a second protrusion of a plurality of second protrusions extending between the piston bowl edge to a maximum height of the piston, wherein the plurality of first protrusions and the plurality of second protrusions are radially aligned.

10. The piston of claim 9, wherein the plurality of first protrusions and the plurality of second protrusions are angled relative to an angle of injection of a fuel injector positioned to inject toward the piston so that a flow path of fuel from the fuel injector extends radially outward, between adjacent protrusions of the plurality of first protrusions and the plurality of second protrusions, and wherein the plurality of first protrusions and the plurality of second protrusions are radially aligned relative to a central axis of the piston at the piston center.

11. The piston of claim 10, wherein one or more of the plurality of first protrusions and the plurality of second protrusions have a width, in a direction perpendicular to a radial direction and the central axis, that increases from the central axis and in a radially outward direction, and wherein one or more of the plurality of first protrusions and the plurality of second protrusions protrude perpendicularly to the central axis.

12. The piston of claim 9, wherein the plurality of first protrusions is completely below and spaced away from the plurality of second protrusions relative to a vertical direction aligned in parallel with a central axis of the piston at the piston center.

13. The piston of claim 9, wherein the plurality of second protrusions traverses an entire range between the piston bowl edge to the maximum height of the piston, and wherein the maximum height corresponds to an outer rim of the piston.

14. The piston of claim 9, wherein the plurality of second protrusions extends from the piston bowl edge to an annular protrusion, the annular protrusion traversing a circumference of the piston between the piston bowl edge and an outer rim of the piston.

15. The piston of claim 9, wherein the plurality of second protrusions is radially spaced away from the piston bowl edge, and where the plurality of second protrusions extends from an annular protrusion to an outer rim of the piston, and wherein the annular protrusion traverses a circumference of the piston between the piston bowl edge and the outer rim of the piston.

16. The piston of claim 9, wherein each protrusion of the plurality of second protrusions is separated from adjacent protrusions of the plurality of second protrusions via a recess, and wherein the recess comprises a U-shape cross-section in a radial direction.

17. An engine, comprising:
at least one combustion chamber comprising a fuel injector positioned to inject fuel therein and a piston comprising one or more surface features shaped to interact with a fuel injection from the fuel injector, the one or more surface features comprising:

a plurality of first protrusions arranged in a piston bowl extending from a maximum height of the piston bowl to an outer edge of the piston bowl, wherein the maximum height corresponds to a tip of a cone centered along a central axis of the piston;

a plurality of second protrusions arranged in a chamfered portion of the piston radially outside of the piston bowl, the plurality of second protrusions extending between the outer edge and an outer rim of the piston, wherein the outer rim corresponds to a maximum height of the piston, and wherein the outer rim is arranged higher than the tip of the cone; and one or more squish features arranged in the outer rim, wherein the one or more squish features are shaped to increase a vortex size adjacent the outer rim.

18. The engine of claim 17, wherein a radial length of the plurality of first protrusions is greater than a radial length of the plurality of second protrusions, wherein the radial length is measured in a direction from a piston central axis to an outer circumference of the piston, and wherein a cross-section of the plurality of first protrusions taken in a radial direction is bow-shaped.

19. The engine of claim 17, wherein each of the plurality of first protrusions, the plurality of second protrusions, and the one or more squish features are spaced apart from one another, and wherein one or more of the plurality of first protrusions, the plurality of second protrusions, and the one or more squish features are radially aligned.

* * * * *